United States Patent
Yoshikawa et al.

[11] Patent Number: 5,808,704
[45] Date of Patent: *Sep. 15, 1998

[54] REAR PROJECTION TYPE IMAGE DISPLAY APPARATUS

[75] Inventors: Hiroki Yoshikawa, Hiratsuka; Takahiko Yoshida, Miura; Kiyoshi Wada, Yokohama; Shigeru Mori, Chigasaki; Tetsu Ohishi, Hiratsuka; Toshimitsu Watanabe, Yokohama; Koji Suso; Yoshimasa Yokoyama, both of Kokubunji; Akira Takahashi, Hidaka; Yasuhiko Komatsu, Chigasaki; Yoshinori Matsumura, Fujisawa; Kazunari Nakagawa, Ebina; Kohsuke Ozeki, Kanagawa-ken; Maki Furui; Naoko Kubo, both of Tokyo; Tutomu Simada, Yokohama; Tohru Mori, Kanagawa-ken; Satoshi Ishizuka, Yokohama, all of Japan

[73] Assignee: Hitachi, Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 367,931
[22] Filed: Jan. 3, 1995

[30] Foreign Application Priority Data

Jan. 17, 1994 [JP] Japan .................................. 6-002940
Feb. 4, 1994 [JP] Japan .................................. 6-012380

[51] Int. Cl.⁶ ................................................ H04N 5/74
[52] U.S. Cl. .................... 348/748; 348/787; 348/789; 353/57; 353/61
[58] Field of Search ........................ 348/787, 788, 348/789, 794, 778, 779, 780, 781, 836, 839, 840, 748, 749, 744, 750; 353/72, 73, 74, 75, 77, 78, 52, 57, 60, 61; H04N 5/64, 5/74, 9/31

[56] References Cited

U.S. PATENT DOCUMENTS

| | | |
|---|---|---|
| 4,131,346 | 12/1978 | Dieckhoff . |
| 4,140,377 | 2/1979 | Hoadley ...................................... 353/78 |
| 4,536,056 | 8/1985 | Oguino . |
| 4,707,746 | 11/1987 | Nishikawa .............................. 348/787 |
| 4,761,063 | 8/1988 | Yoshioka et al. . |
| 4,792,217 | 12/1988 | Yoshioka . |
| 4,804,884 | 2/1989 | Vriens et al. ........................... 348/780 |
| 4,882,599 | 11/1989 | Grunwald ................................. 353/60 |
| 4,925,295 | 5/1990 | Ogawa et al. . |
| 5,090,880 | 2/1992 | Ushiro ...................................... 353/71 |
| 5,200,814 | 4/1993 | Hirata et al. . |
| 5,272,540 | 12/1993 | Hirata et al. . |
| 5,430,501 | 7/1995 | Nakamura . |
| 5,557,343 | 9/1996 | Yamagishi ............................. 348/781 |

FOREIGN PATENT DOCUMENTS

| | | |
|---|---|---|
| 0567330A2 | of 0000 | European Pat. Off. . |
| 91310749 | 11/1991 | European Pat. Off. . |
| 2-94784 | 4/1990 | Japan . |
| 4-333038 | 9/1991 | Japan . |
| 4-96182 | 8/1992 | Japan . |
| 5-130541 | 5/1993 | Japan . |
| 5-183847 | 7/1993 | Japan . |

*Primary Examiner*—Michael Lee
*Attorney, Agent, or Firm*—Fay Sharpe Beall Fagan, Minnich & McKee

[57] ABSTRACT

A rear projection type image display apparatus having an arrangement that a projection distance of a projection lens thereof is shortened and a density of mounting of parts relating to an optical system and an electric system is made higher. Furthermore, a width of a rear portion of a housing of the rear projection type image display apparatus is reduced rearwards at any position from the upper portion to the lower portion thereof, and the lower portion of a back cover is depressed inwards. Thus, a space required to install the rear projection type image display apparatus can be reduced, the rear surface of the apparatus can be disposed on a wall without any gap when the apparatus is installed along the wall, and the overall body of the apparatus can be received deep into a corner of walls when the apparatus is installed at the corner.

13 Claims, 31 Drawing Sheets

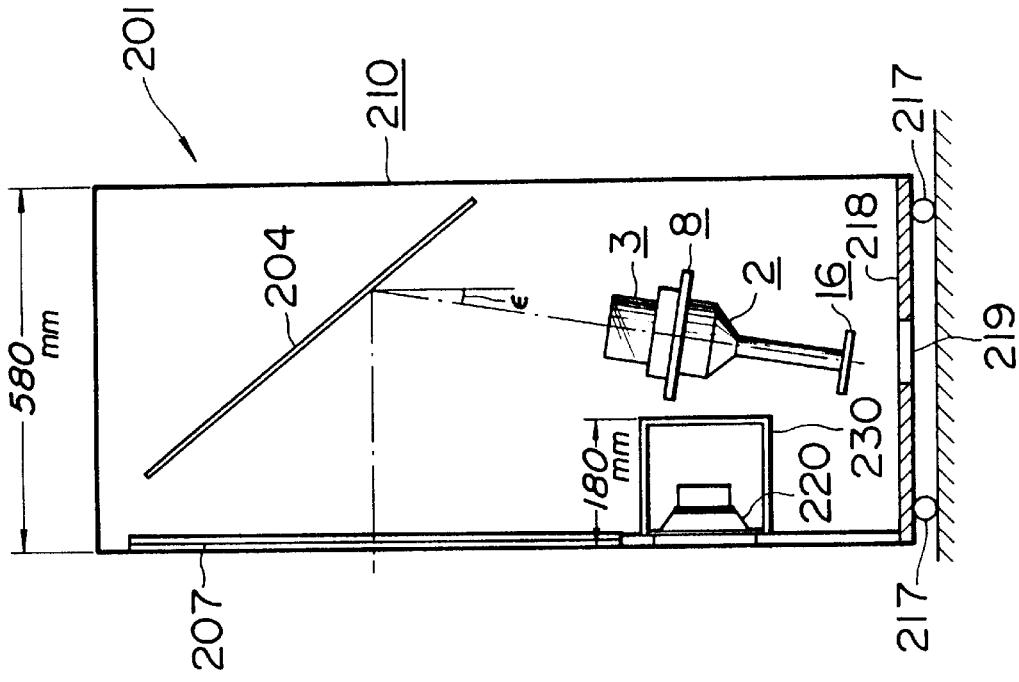

REAR PROJECTION TYPE IMAGE DISPLAY APPARATUS

BACKGROUND OF THE INVENTION

1. Field of the Invention

The present invention relates to a rear projection type image display apparatus including, in a housing thereof, a projection type image display device that enlarges an image displayed on an image generation source by a projection lens to project and form the image on a transmission type screen. More particularly, the present invention relates to a rear projection type image display apparatus of a type (hereinafter called a "specific type") accommodating while being secured at predetermined positions in a housing thereof, a projection type image display device having a plurality of image generation sources, a transmission type screen, a plurality of projection lenses, corresponding to the respective image generation sources, for projecting images displayed by the plurality of image generation sources on the transmission type screen, and a reflecting mirror for reflecting light projected by the projection lenses at an intermediate position; and an electric circuit for displaying the images on the image generation sources.

2. Description of the Related Art

A rear projection type image display apparatus that enlarges an image displayed on an image generation source such as a relatively small projection type cathode-ray tube by a projection lens to project the image on a transmission type screen has achieved a remarkable improvement of image quality in recent years due to advancement of optical engineering, electronic engineering and productive engineering and thus the rear projection type image display apparatus has come to be used widely.

In, for example, Japanese Patent Unexamined Publication No. 2-94784, Japanese Utility Model Unexamined Publication No. 4-96182, Japanese Patent Unexamined Publication No. 4-333038, Japanese Patent Unexamined Publication No. 5-130541 and Japanese Patent Unexamined Publication No. 5-183847, examples of the rear projection type image display apparatus have been disclosed. The rear projection type image display apparatus disclosed above will now be described in detail with reference to the drawings.

FIG. 57 is a perspective view which includes a partial cross section and which illustrates the rear projection type image display apparatus disclosed in Japanese Patent Unexamined Publication No. 2-94784. Referring to FIG. 57, reference numerals and symbols 22a, 22b and 22c (generically represented by 22) respectively represent red, green and blue projection type cathode-ray tubes, 23a, 23b and 23c respectively represent red, green and blue projection lenses, 24 represents a reflecting mirror, and 27 represents a transmission type screen. Reference numeral 28 represents a coupler for mechanically and optically coupling the projection type cathode-ray tube 22 and the projection lens 23 with each other, the coupler 28 being constituted by a red coupler 28a, a green coupler 28b and a blue coupler 28c. Reference numeral 29 represents an electric circuit for displaying an image on the projection type cathode-ray tube 22. Reference numeral 21 represents a housing for accommodating the foregoing optical units and the electric circuit at predetermined positions while securing them. In the rear projection type image display apparatus, an image (not shown) displayed on the projection type cathode-ray tube 22 is, by the projection lens 23, enlarged and projected on the transmission type screen 27 so that an image is obtained. The reflecting mirror 24 reflects light projected from the projection lens 23 at an intermediate position of an optical path thereof so as to shorten the depth of the housing 21 of the rear projection type image display apparatus. The foregoing state is shown in FIG. 58.

Referring to FIG. 58, the same reference numerals as those shown in FIG. 57 represent the same parts. The projection type cathode-ray tube 22, the projection lens 23 and the coupler 28 indicated by dashed lines represent their hypothetical positions in a case where projected light is assumed not to be reflected by the reflecting mirror 24. If the reflecting mirror 24 is not used, the housing 21 must be enlarged to the positions of the optical parts indicated by the dashed lines. As described above, the reflecting mirror 24 is able to shorten the depth of the housing 21 of the rear projection type image display.

Referring to FIG. 59 which is a perspective view of the rear projection type image display when viewed from the back side, the housing 21 has a convection air outlet 26 for discharging heat generated in the electric circuit 29 shown in FIG. 57 to the outside of the housing 21. The reason why the convection air outlet 26 is formed on the rear side of the housing 21 will now be described with reference to FIG. 60.

In FIG. 60 which is a side cross sectional view of FIG. 57, the same reference numerals as those shown in FIG. 57 represent the same parts. The rear projection type image display apparatus is vertically separated into two spaces A and B. An upper space A accommodates therein optical parts, such as the projection lens 23, the reflecting mirror 24 and the transmission type screen 27. A lower space B accommodates therein electric parts, such as the projection type cathode-ray tube 22 and the electric circuit 29. The upper space A and the lower space B are separated from each other by generally horizontal metallic setting parts 25 of couplers in such a manner that the mutual air flow is inhibited. The reason why the rear projection type image display apparatus is divided into the upper space A and the lower space B is that the lower space B accommodating a major portion of the heat generation sources of the rear projection type image display apparatus must be cooled by ventilation as contrasted with the upper space A, in which relatively low heat generation source is accommodated, and which must be sealed up in order to prevent contamination of the optical parts from dust. The lower space B is ventilated along an air flow passage C passing from a convection air inlet 32 formed in a base board 31 of the housing 21 to the convection air outlet 26 formed on the back surface of the housing 21.

A phosphor surface panel (not shown) of the projection type cathode-ray tube 22, which is only the heat generation source in the upper space A, is cooled by cooling liquid (not shown) enclosed in the coupler 28. The cooling liquid heated by the phosphor surface panel is allowed to pass through the coupler 28 and then it is discharged outwards. However, only about 20% of the heat is, due to natural convection, discharged to the upper space A by fins (not shown) of the coupler 28, while about 80% of the heat is discharged due to conduction heat transfer through the metallic setting parts 25 of couplers. Therefore, the metallic setting parts 25 of couplers are required to satisfactorily discharge the heat. Hence, the convection air outlet 26 is formed on the back surface of the housing 21 so that the metallic setting parts 25 of couplers are placed in the ventilating passage C in the lower space B. Because of the foregoing reason, the convection air outlet 26 is formed on the back surface of the housing 21.

In Japanese Patent Unexamined Publication No. 5-130541, an integral body of back cover (3) has been disclosed in its FIG. 2 and so forth. In Japanese Utility Model Unexamined Publication No. 4-96182, an integral body of shield case (13) tapered rearwards (the width is reduced rearwards) has been disclosed.

In Japanese Patent Unexamined Publication No. 4-333038, a structure having a back cover tapered rearwards and so forth has been disclosed with reference to accompanying FIGS. 4 and 8.

In Japanese Patent Unexamined Publication No. 5-183847, a structure of a cabinet (a frame) for holding a transmission type screen (3) and a reflecting mirror (9) and an arrangement that the back cover is tapered rearwards (the width is reduced) have been disclosed.

However, the conventional rear projection type image displays have been directed to a type having a length of the diagonal lines of the transmission type screen for displaying the projected image of 36 inches or longer, and its depth no less than about 450 mm.

A transmission type screen having a diagonal length of 40 inches or longer must have a depth 10.8 mm or longer with respect to one inch of the diagonal length of the transmission type screen. A transmission type screen having a diagonal length of 46 inches has a depth of 500 mm, that having a diagonal length of 50 inches has a depth of 540 mm and that having a diagonal length of 60 inches has a depth of 650 mm.

Therefore, the conventional rear projection type image display apparatus involves a problem that a wide space is required to be installed.

If three loud speakers are attached to the front surface of the housing to realize a 3-1 type stereo sound system optimum for the Hivision system, the depth must be increased further more, thus raising a problem in that the required space should be increased further.

Furthermore, the conventional rear projection type image display apparatus of the type shown in FIG. 59 has a structure that the back or rear surface of the housing 21 has a portion 21a for covering the reflecting mirror 24 and a portion 21b for covering electric circuit that have different shapes. Thus, the rear projection type image display apparatus cannot have a trim back surface. Furthermore, the back cover 21 of a type (for example, shown FIG. 1 of Japanese Patent Unexamined Publication No. 5-183847) having a structure that a lower cover 21c projects independently of an upper back cover 21a as designated by an imaginary line 21c in FIG. 59 involves a problem that dust can easily be accumulated on an upper surface 21d of the lower back cover 21c and the like. The foregoing problems also applies to Japanese Patent Unexamined Publication No. 5-130541 which has disclosed the integral body of back cover in its FIG. 3 and so forth.

As described above, the conventional rear projection type image display apparatus of the type disclosed in Japanese Patent Unexamined Publication No. 2-94784 has the structure that the heat generation parts in the housing 21 are cooled by use of the convection air outlet 26 in the back surface of the housing 21. Although Japanese Patent Unexamined Publication No. 5-183847 has no explicit disclosure relating to cooling, assuming hypothetically that a convection air outlet 26a is formed in the back surface of the lower back cover indicated with the imaginary line 21c shown in FIG. 59, if a rear projection type image display apparatus of the foregoing type is intended to be installed along the wall of a room without any gap, the convection air outlet 26a is covered by the wall. Therefore, heat generated from the electric parts will not be discharged outside the housing 21, thus inhibiting the conventional rear projection type image display apparatus of the foregoing type from being installed along the wall of a room without a gap. In the commercially available rear projection type image display apparatus, it is instructed, in manuals thereof, such that the rear projection type image display apparatus must be placed away from the wall by about 10 cm. However, this way of installation results in that the rear projection type image display apparatus to considerably project over other furniture, causing a person to be oppressed and to feel the atmosphere of the room deteriorated in view of interior designing. In Japanese Patent Unexamined Publication No. 5-183847, a structure has been described with reference to its FIG. 9 in which the amount of rearward projection of the lower portion of the back cover is reduced as compared with the amount of the rearward projection of the upper portion of the same.

Some of the conventional rear projection type image display apparatuses has a structure that the upper portion 21a of the rear surface of the back cover 21 shown in FIG. 59 for covering the reflecting mirror 24 is relatively rearwards tapered; and the lower portion 21c for covering the electric circuit 29 has, however, a rectangle-like cross sectional shape in order to have a sufficiently-large space for accommodating the electric circuit 29. In a case where the conventional rear projection type image display apparatus of this type is installed at the corner of a room, the overall apparatus body cannot be placed into the corner because the portion 21c for covering the electric circuit 29 has a portion which is not sufficiently tapered rearwards although the portion 21a for covering the reflecting mirror 24 has a tapered rear portion. Thus, there arises a problem in that the apparatus considerably projects toward the central portion of the room.

SUMMARY OF THE INVENTION

A general object of the present invention is to provide a rear projection type image display apparatus of the specific type capable of solving at least a part of the foregoing problems experienced with the conventional specific type rear projection type image display apparatus.

A first object of the present invention is to provide a rear projection type image display apparatus with which a space required for installation can be reduced.

The first object can be achieved by a rear projection type image display apparatus of the specific type wherein an aspect ratio of the transmission type screen is about 16:9, a size of the screen being 36 to 40 inches or the aspect ratio is about 4:3, the size of the screen being 36 to 40 inches; and a depth of the housing is 400 mm or shorter.

Another object of the present invention is to provide a rear projection type image display apparatus of the specific type which can be installed such that its rear surface can be disposed along a wall without any gap therefrom when the apparatus is installed along the wall.

Still another object of the present invention is to provide a rear projection type image display apparatus of the specific type, a heat generating parts of which can be cooled assuredly, and a height of which can be lowered.

Still another object of the present invention is to provide a rear projection type image display apparatus of the specific type exhibiting excellent appearance because a rear surface of the apparatus can be trimmed in terms of design.

Still another object of the present invention is to provide a rear projection type image display apparatus of the specific type that can completely be received deeply into a corner of a room when the apparatus is installed on the corner.

A rear projection type image display apparatus according to an embodiment of the present invention has a structure that a height of a center of the transmission type screen is 750 mm or shorter, and preferably a projection distance of the projection lens is 640 mm or shorter.

The rear projection type image display apparatus according to an embodiment of the present invention has a structure that the projection lens comprises five lens groups composed of one biconvex lens group having power of not lower than 70% of a total power of the projection lens system with a radius of curvature of a surface thereof facing the transmission type screen smaller than that of a surface facing the image display means, and four aspherical lens groups having at least two aspherical lens groups disposed in front of the biconvex spherical lens group, and other at least two aspherical groups disposed in the rear of the biconvex lens group, among the five lens groups, the lens group nearest the image display means having a negative power; the two aspherical lens groups disposed near or to the transmission type screen than the lens group having the largest positive power are arranged such that a periphery portion of an incidence surface of a first aspherical lens group positioned at a side of the transmission type screen and a periphery portion of an exit surface of a second aspherical lens group positioned at a side of the image display are curved in the same direction as a direction in which an exit surface of the lens group with the highest power is curved; the second aspherical lens group is having a central portion with zero or positive power.

The rear projection type image display apparatus according to an embodiment of the present invention has a structure that an image display surface of the image generation source is a spherical surface curved in a shape of an arch that has a center of curvature at a side of the transmission type screen.

The rear projection type image display apparatus according to an embodiment of the present invention has a structure that the projection lens and the image generation source are disposed at a level lower than a lower end of the transmission type screen.

The rear projection type image display apparatus according to an embodiment of the present invention has a structure that an electric circuit board having the largest size among the at least one electric circuit board constituting the electric circuit has a depth of 300 mm or shorter, more preferably the electric circuit board having the largest size among the at least one electric circuit board constituting the electric circuit has a width of 580 mm (smaller than the minimum width of a lower end portion of the reflecting mirror) to 740 mm (corresponding to the width of 760 mm of rear portion of the housing enabling to provide an effect of rearwardly reduced width), and preferably the electric circuit board having the largest size among the at least one electric circuit board constituting the electric circuit is disposed on a bottom surface of the housing in a manner not to overlap, when viewed from an upper position, an electric board for generating an image of the image generation source.

The rear projection type image display apparatus according to an embodiment of the present invention has a structure that right and left sound reproducing systems are disposed in the housing, and a low frequency reproduction characteristic (a sound power frequency response) is made different between the right sound reproducing system and the left sound reproducing system, preferably (1) a first enclosure constituting the left sound reproducing system and a second enclosure constituting the right sound reproducing system have different capacities or volumes, and more preferably the first enclosure constituting one of the left and right sound reproducing systems is formed into a closed box type and the second enclosure constituting another of the left and right sound reproducing systems has a bass-reflex cabinet type; or both of the first and second enclosures constituting the left and right sound reproducing systems are formed into a bass-reflex cabinet type each comprising a port (or vent) tube having the same shape, or both of the first and second enclosures constituting the left and right sound reproducing systems are formed into a bass-reflex cabinet type, and a resonant frequency of a port of one of the enclosures having a larger capacity or volume is set to be lower (a length of the port tube to be formed longer) than the other. Further preferably, the rear projection type image display apparatus further comprises a peaking circuit for emphasizing a low frequency range of an audio signal to be supplied to the sound reproducing system which forms the enclosure having a smaller capacity or volume. Preferably, (2) the rear projection type image display apparatus has a structure that a first bass-range emphasizing circuit for driving the left sound reproducing system and a second bass-range emphasizing circuit for driving the right sound reproducing system have different emphasizing frequencies. More preferably, (3) the rear projection type image display has a structure that a HPF for detecting medium to high tone components of an input audio signal, a BPF for detecting medium to low tone components of the input audio signal and a LPF for detecting low tone components of the input audio signal respectively are provided independently in right and left systems, the rear projection type image display apparatus further comprises a first adder circuit for adding output signals from the right and left BPFs to each other and a second adder circuit for adding output signals from the right and left LPFs to each other, an output from the first adder circuit is delivered from the first or left sound reproducing system and an output from the second adder circuit is delivered from the second or right sound reproducing system.

The rear projection type image display apparatus according to an embodiment of the present invention has a structure that the housing includes right and left sound reproducing systems, and taking a distance from a lower end of an image display region of the transmission type screen to a floor on which the rear projection type image display apparatus is installed as "h1" and a distance from a position at which the sound reproducing system generates sound (for example, a position of a voice coil of a loud speaker) to the floor as "h2", the following relationship is satisfied: h2>h1/2, preferably the right and left sound reproducing systems are composed of four loud speakers including loud speakers (tweeters) for reproducing a high frequency range and loud speakers (woofers) for reproducing a low frequency range, and the tweeters are disposed lower than the woofers; or the right and left sound reproducing systems are composed of four loud speakers including loud speakers (tweeters) for reproducing a high frequency range and loud speakers (woofers) for reproducing a low frequency range, and two port tubes for bass-reflex cabinet type, the woofers, tweeters and port tubes being disposed in this sequential order when viewed from an upper position.

In order to achieve at least a part of the foregoing objects, a rear projection type image display apparatus of the specific type according to the present invention has a structure:

(1) that a convection air outlet is formed in a rear surface of the housing, and at least a portion of the rear surface of the housing having the convection air outlet is depressed inward or toward the transmission type screen from an outermost portion of the housing when viewed from a side position of the apparatus;

(2) that an electric circuit board having the largest size among at least one electric circuit board constituting the electric circuit is disposed on a bottom surface in the housing and heat generated mainly by the electric circuit board is discharged from the electric circuit board to outside of the housing by an air duct having one or more electric fans;

(3) that a back cover for constituting a rear surface of the housing has a structure integrating an upper portion and a lower portion of the back cover, and the back cover covers the top surface of the housing or both side surfaces of the housing;

(4) that a width of a rear portion of the housing is reduced rearwards in such a manner that a sectional shape thereof taken along a horizontal surface including a lower end of the reflecting mirror is substantially the same as a sectional shape thereof taken along a horizontal surface including a base board constituting a lower portion of the housing; and/or (5) a diagonal size of the transmission type screen is 40 inches or larger, and a depth of the housing is 10 mm or less with respect to one inch of the screen size.

The foregoing and other objects, features as well as advantages of the invention will be made clearer from the following description of preferred embodiments referring to attached drawings.

BRIEF DESCRIPTION OF THE DRAWINGS

FIG. 55 is a side sectional view which schematically illustrates relationship of positions of parts in the rear projection type image display apparatus shown in FIG. 53 relating to the optical system;

FIG. 56 is a side sectional view which schematically illustrates relationship of positions of parts relating to the optical system in a rear projection type image display apparatus according to an embodiment of the present invention and having a center loud speaker;

DETAILED DESCRIPTION OF PREFERRED EMBODIMENTS

Figure 1:
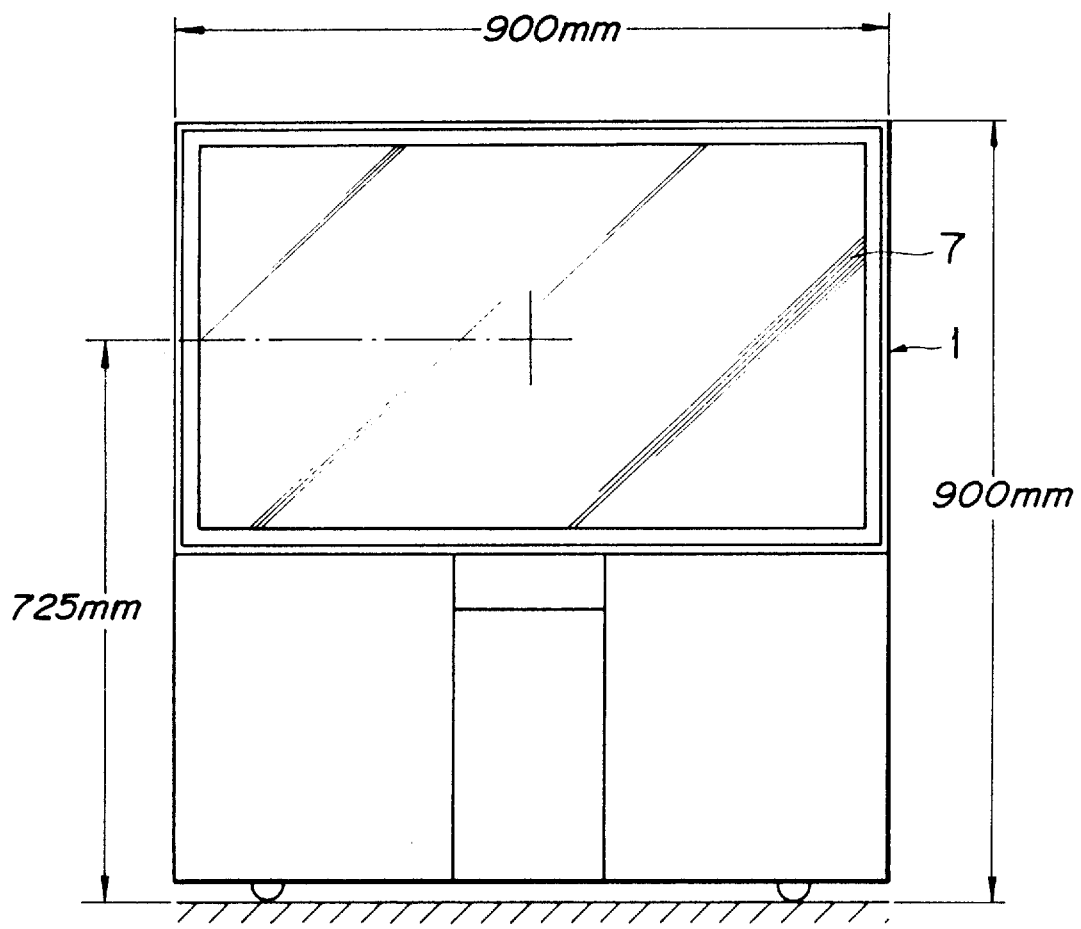
FIG. 1 is a front view which schematically illustrates a shape of a rear projection type image display apparatus according to an embodiment of the present invention.
Figure 2:
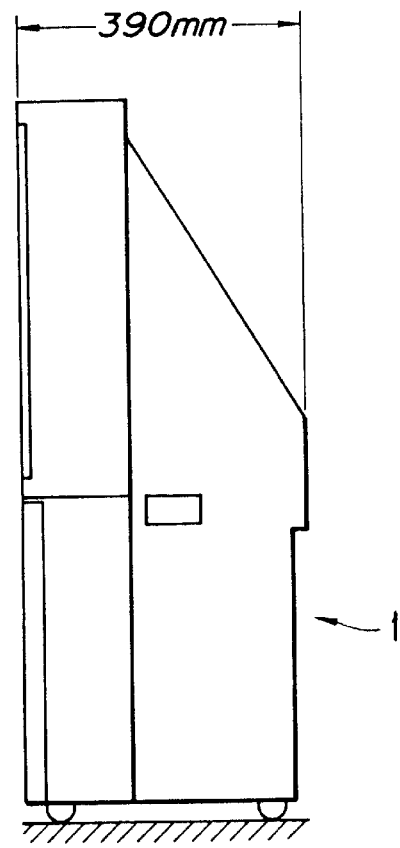
FIG. 2 is a side view which schematically illustrates the shape of the apparatus shown in FIG. 1.

Referring to FIGS. 1 and 2, reference numeral 1 represents a rear projection type image display apparatus, and 7 represents a transmission type screen.

The transmission type screen 7 according to this embodiment has a screen size of 38 inches and an aspect ratio of 16:9.

Although the aspect ratio of the current transmission type screens has been mainly 4:3, a new type image display having an aspect ratio of 16:9 is comming to be used widely. The reason why the rear projection type image display apparatus according to an embodiment of the present invention has a screen size of 38 inches and an aspect ratio of 16:9 will now be described with reference to FIG. 3.

Figure 3:
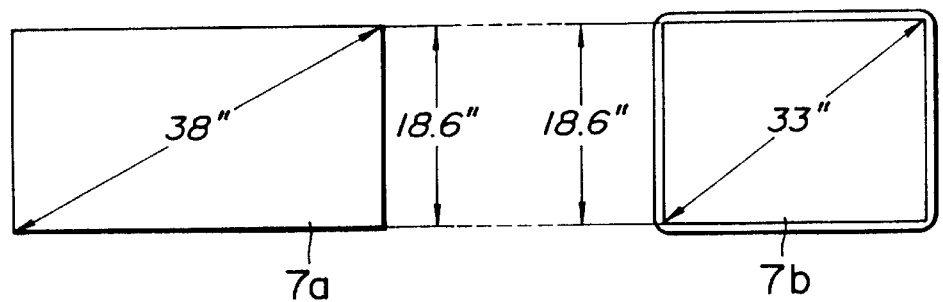
FIG. 3 is a diagram for comparing the screen size of a rear projection type image display apparatus, the aspect ratio of the screen of which is 16:9, with that of a direct view type image display device the aspect ratio of the screen of which is 4:3.

FIG. 3 is a diagram to compare the screen size of the rear projection type image display apparatus comprising a screen 7a, having an aspect ratio of 16:9, and that of a direct view type image display device comprising a screen 7b having an aspect ratio of 4:3. Since the screen size of the rear projection type image display apparatus is the actual length of the diagonal line of the transmission type screen 7, the vertical length of the 38-inch screen 7a having the aspect ratio of 16:9 is 18.6 inches. On the other hand, the screen size of the direct view type image display device is the length of the diagonal line of the cathode-ray tube. Therefore, the vertical length of the 33-inch screen 7b having the aspect ratio of 4:3 is also 18.6 inches. This means that, if an image having an aspect ratio of 4:3 is displayed on the 38-inch rear projection type image display apparatus having the aspect ratio of 16:9, the size of the displayed image is not smaller than the screen size of the 33-inch direct view type image display device having the aspect ratio of 4:3. Therefore, even if the 33-inch direct view type image display device having the aspect ratio of 4:3 is replaced by the 38-inch rear projection type image display apparatus having the aspect ratio of 16:9, a viewer does not feel that the screen is small.

Figure 4:
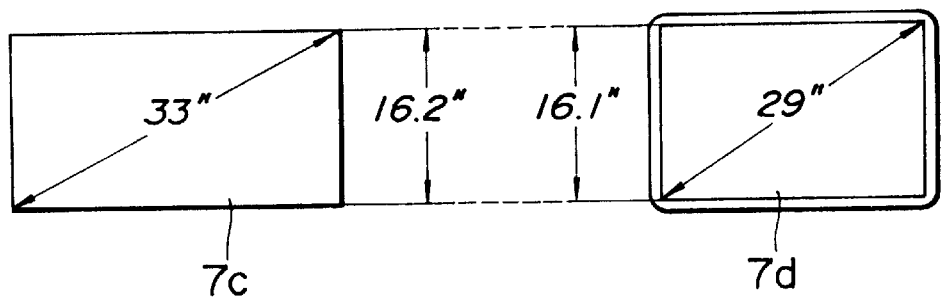
FIG. 4 is a diagram for comparing the screen size of a rear projection type image display apparatus, the aspect ratio of the screen of which is 16:9 and the size of the screen of which is 33 inches, with that of a direct view type image display device, the aspect ratio of the screen of which is 4:3 and the size of the screen of which is 29 inches.

FIG. 4 is a diagram to compare the screen size of a 33-inch rear projection type image display apparatus comprising a screen 7c having an aspect ratio of 16:9 and that of a 29-inch direct view type image display device comprising a screen 7d having an aspect ratio of 4:3. It can be understood that the vertical length of the screen of the 33-inch rear projection type image display apparatus having the aspect ratio of 16:9 is somewhat larger than that of the 29-inch direct view type image display device having the aspect ratio of 4:3. As described above, when the 29-inch direct view type image display device comprising the screen having the aspect ratio of 4:3 is replaced by the rear projection type image display apparatus comprising the screen having the aspect ratio of 16:9, the screen size of the rear projection type image display apparatus must be 33 inches or larger, and preferably 38 inches or larger.

Because of the foregoing reason, the screen of the rear projection type image display apparatus according to this embodiment of the present invention has the size of 38 inches and the aspect ratio of 16:9. However, the aspect ratio of the screen of the rear projection type image display apparatus comprising the screen having a size not larger than 40 inches is not limited to 16:9. However, in order to display an image displayed on a screen having the aspect ratio of 16:9 and a size of 33 inches or larger on a screen having the aspect ratio of 4:3, the screen must have a size not less than 36 inches. In order to display an image displayed on a screen having the aspect ratio of 16:9 and a size of 38 inches or larger on a screen having the aspect ratio of 4:3, the screen must have a size not less than 41 inches. At first, the explanation is made hereafter with respect to various embodiments of a rear projection type image display apparatus.

Therefore, the screen of the rear projection type image display apparatus comprising the screen whose aspect ratio is 4:3 must have a size not less than 36 inches, and preferably not less than 41 inches. An embodiment of the rear projection type image display comprising the screen having a size not less than 40 inches will be described later.

Figure 5:
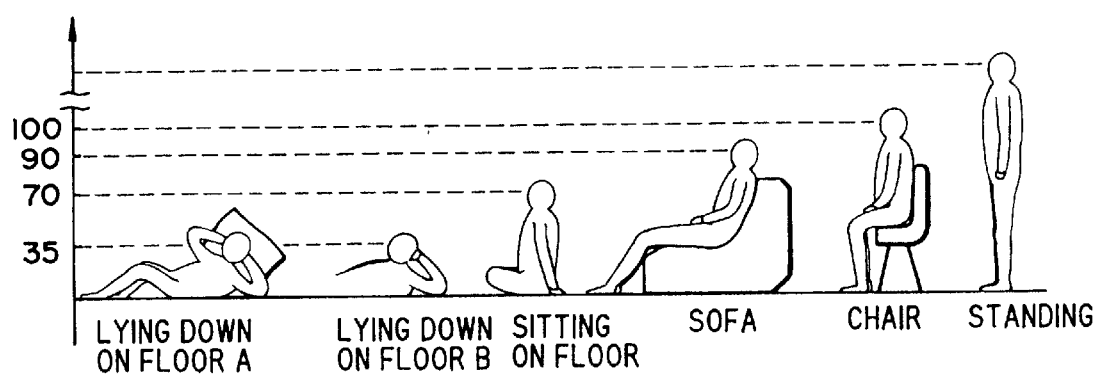
FIG. 5 is a diagram which illustrates the watching poses and heights of eyes when a viewer watches the image display apparatus at an ordinary home.

In the embodiment shown in FIG. 1, the height of a main body of the rear projection type image display apparatus 1 is 990 mm as shown in FIG. 1. This value is determined in accordance with an assumption that the height of the central portion of the 38-inch screen having the aspect ratio of 16:9 is preferred to be 725 mm. The reason why the height of the central portion of the screen is assumed to be 725 mm will now be described with reference to FIG. 5 and Table 1. FIG. 5 illustrates the relationship between the watching pose and the height of the eyes when a viewer watches the image display at an ordinary home. Table 1 shows results of a sensitivity test performed by the inventor and so forth for examining the easiness for a viewer to watch the screen with any of the watching poses shown in FIG. 5 at various heights of the central portion of the screen of the image display. The test was performed by fifteen Japanese men and women testees of 155 cm to 180 cm tall. Note that if the average height is different from the value (155–180 cm tall) employed in this test in countries such as the U.S., England, and China, the value may be converted adequately.

TABLE 1

Results of Sensitivity Test

| | Height of Center of Screen of Image Display (mm) | | | |
|---|---|---|---|---|
| | 691 | 725 | 755 | 800 |
| Standing | Δ | Δ | Δ | Δ |
| Chair | Δ | Δ | Δ | ○ |
| Sofa | Δ | ○ | ○ | Δ |
| Sitting on a Floor | ○ | Δ | X | X |
| Lying down on a Floor | Δ | Δ | Δ | Δ |

In Table 1, symbol ○ represents excellent, Δ represents allowable brightness and X represents too dark for the testee to exhaust or to be weared due to the brightness darkness of the overall screen and the watching pose.

As can be understood from Table 1, the result "excellent" represented by symbol ○ are given such that the height of the central portion of the screen of the image display becomes higher as the height of the eyes shown in FIG. 5 becomes higher. The results "allowable" and "too dark" respectively represented by symbols Δ and X were inverted partially between "sitting on a floor" and "lying down on a floor". The reason for this is that, when the height of the central portion of the screen of the image display exceeds 755 mm, "lying down on a floor" is the pose originally looking up the screen and therefore the foregoing heights are acceptable. However, such height is not acceptable when "sitting on a floor" because the testee is forced to look up the screen, which causes majority of the testees to be exhausted. In accordance with the results above, the upper limit of the height of the central portion of the screen of the image display must be 750 mm or lower, and preferably 725 mm or lower.

In this embodiment, the width of the main body of the rear projection type image display apparatus 1 is 900 mm as shown in FIG. 1. This value is determined in accordance with the size of the 38-inch screen having the aspect ratio of 16:9. In the case where the screen has the size of 33 inches and the aspect ratio of 16:9, the width of the main body becomes about 790 mm.

The depth of the main body is 390 mm as shown in FIG. 2. The reason why the depth of the body is determined to be 400 mm or less is that the body must be satisfactorily installed together with other furniture in Japanese home. The depth of the furniture is usually about 600 mm, which is the depth of a wardrobe or the like, to about 450 mm which is the depth of a chest or the like. The depth of a sideboard or the like installed in a living room, in which the image display apparatus is usually installed, is about 400 mm. In order to satisfactorily install the image display apparatus while being disposed together with the sideboard having the shortest depth, the depth of the image display body must be also 400 mm or shorter. If the usual size of the furniture is different from the foregoing size in U.S., England, China or the like, it should be considered that the value may be converted adequately.

Figure 6:
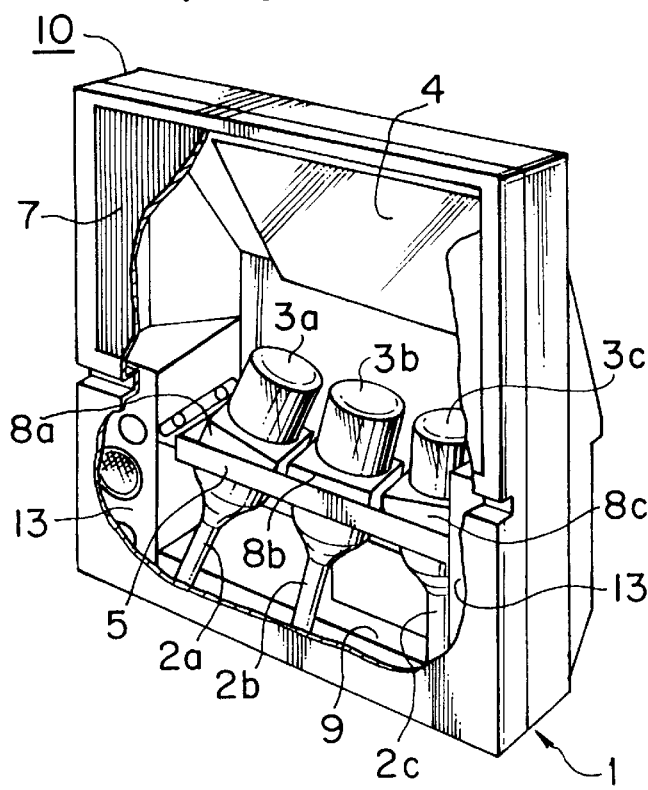
FIG. 6 is a partially broken perspective view which schematically illustrates an internal structure of the display apparatus shown in FIG. 1.
Figure 7:
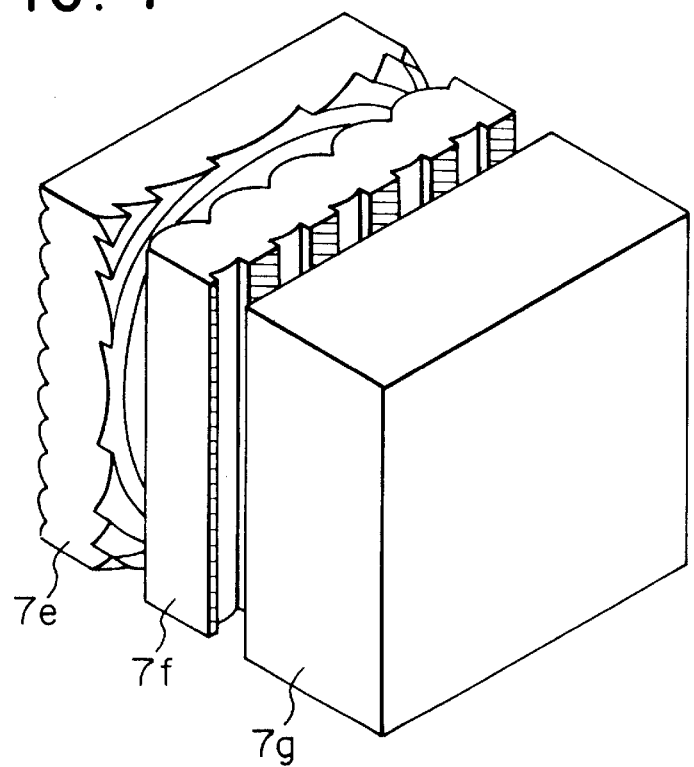
FIG. 7 is a perspective view which illustrates an example of the transmission type screen of the display apparatus shown in FIG. 1.

Referring to FIG. 6, reference numeral 2 represents a projection type cathode-ray tube, more specifically the projection type cathode-ray tube comprising a projection type cathode-ray tube of red 2a, a projection type cathode-ray tube of green 2b and a projection type cathode-ray tube of blue 2c (the projection type cathode-ray tubes 2a, 2b and 2c are generically represented by 2; as to others such as "3" to be described later similar representation is made hereafter). Although this embodiment includes the projection type cathode-ray tube as the image generation source, the image generation source may be, in place of the projection type cathode-ray tube, a combination of transmission type liquid crystal display device and a light source for irradiating the liquid crystal display device from a rear position or a plasma-type image display. Reference numeral 3 represents a projection lens comprising projection lenses 3a for the projection type cathode-ray tube of red 2a, projection lenses 3b for the projection type cathode-ray tube of green 2b and projection lenses 3c for the projection type cathode-ray tube of blue 2c. Reference numeral 8 represents a coupler for mechanically and optically coupling the projection type cathode-ray tube 2 and the projection lens 3 with each other, the coupler 8 comprising a coupler 8a for the projection type cathode-ray tube of red 2a, a coupler 8b for the projection type cathode-ray tube of green 2b and a coupler 8c for the projection type cathode-ray tube of blue 2c. Reference numeral 4 represents a reflecting mirror, and 7 represents a transmission type screen. The transmission type screen 7, as shown in FIG. 7, comprises a Fresnel lens sheet 7e, and a lenticular lens shet 7f and a protection sheet 7g. As for the detailed structure of the transmission type screen 7, refer to U.S. patent application Ser. No. 07/938,861 which is incorporated herein by reference thereto. Instead, the screen 7 disclosed in U.S. Pat. No. 4,536,056 may be used. Reference numeral 9 represents an electric circuit for displaying an image on the projection type cathode-ray tube 2. Reference numeral 10 represents a housing made of resin, wood or metal and accommodating therein the foregoing image display devices and electric circuits which are secured at predetermined positions therein. The coupler 8a for the projection type cathode-ray tube of red, coupler 8b for the projection type cathode-ray tube of green and the coupler 8c for the projection type cathode-ray tube of blue are secured to a metallic setting parts 5 of couplers in an inline manner, while the metallic setting parts 5 of couplers are secured to the side surface of a loud speaker chamber 13 serving also as a lower structure of the housing 10.

In the rear projection type image display apparatus, an image (not shown) displayed on the projection type cathode-ray tube 2 is enlarged and projected on the transmission type screen 7 by the projection lens 3 so that an image is formed. The reflecting mirror 4 reflects light projected by the projection lens 3 at an intermediate position of the optical path so as to shorten the depth of the housing of the rear projection type image display apparatus 1.

Components of a typical example of the rear projection type image display apparatus according to this embodiment comprising the transmission type screen 7, the diagonal size of which is 38 inches, will now be described.

Figure 8:
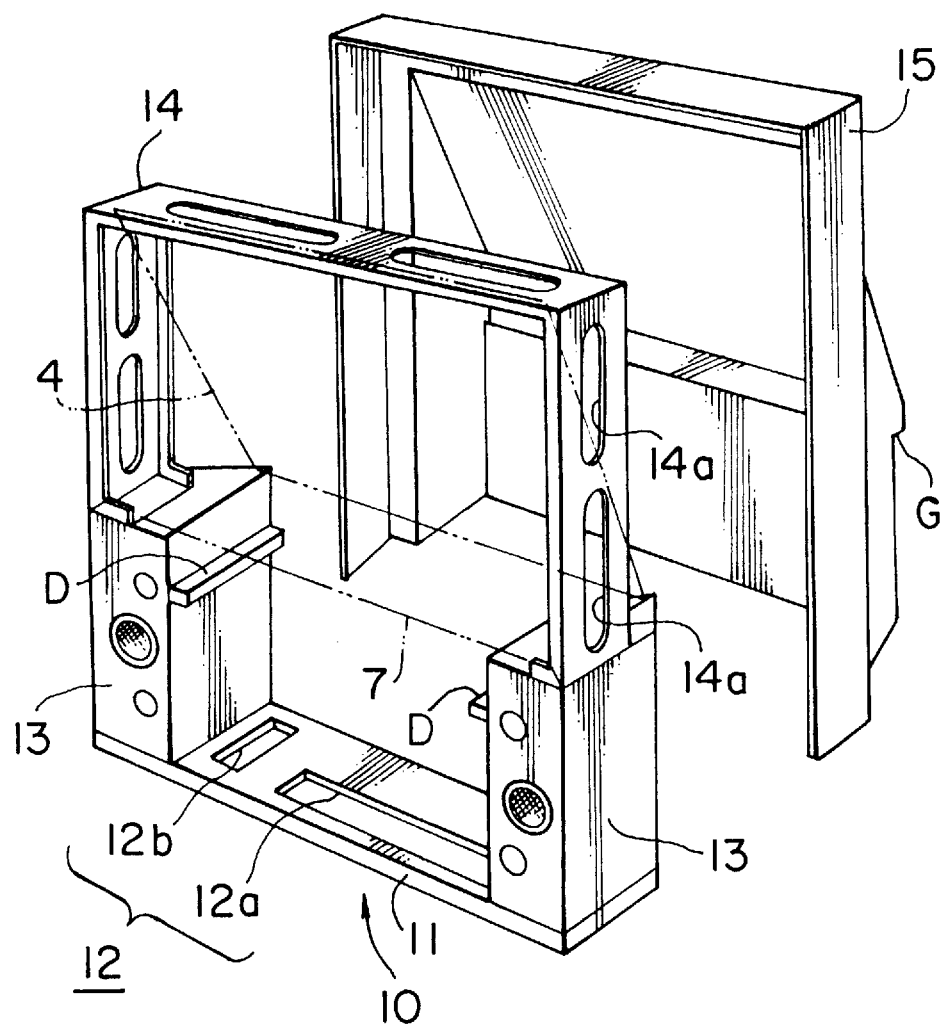
FIG. 8 is an exploded perspective view explanatory of parts constituting a housing of a rear projection type image display apparatus according to an embodiment of the present invention.

Referring to FIG. 8, reference numeral 11 represents a base board 11, 13 represents right and left loud speaker chambers in a pair secured to the base board 11, 14 represents an arch-like structure for securing and supporting the transmission type screen 7 whose only lower end is indicated by an imaginary line and the reflecting mirror 4 which is also indicated by imaginary lines, and 15 represents a back cover. Although these parts are made of resin, wood or metal, the present invention is not limited to the material of the parts. The base board 11 has a convection air inlet 12.

The arch-like structure 14 has lightening holes 14a in order to reduce the weight thereof. Portions D of the loud speaker chambers 13 are projections for securing the metallic setting parts 5 of couplers (not shown). Conventionally, the metallic setting parts 5 of couplers have been secured to the upper portions of the loud speaker chambers 13, while the portions D of the loud speaker chambers 13 are used to secure the metallic setting parts 5 of couplers to the side surfaces of the loud speaker chambers 13 in the embodiment of the invention. As a result, the size of the metallic setting parts 5 of couplers can be reduced, and thus the overall weight of the display apparatus can be reduced. Although the material of the back cover 15 is not limited in the present invention, employment of resin molding will reduce the weight. The back cover 15 comprises an integral structure of upper and lower sections. Furthermore, the side faces and the top cover of the back cover 15 are formed integrally. Thus, the back surface of the display apparatus can be trimmed in terms of the design. Since no seam or convention is required, dust accumulation can be minimized and cleaning of the display apparatus can be performed easily.

The reason why the depth of the rear projection type image display apparatus according to the present invention can be reduced as compared with the conventional rear projection type image display apparatus will now be described.

Figure 9:
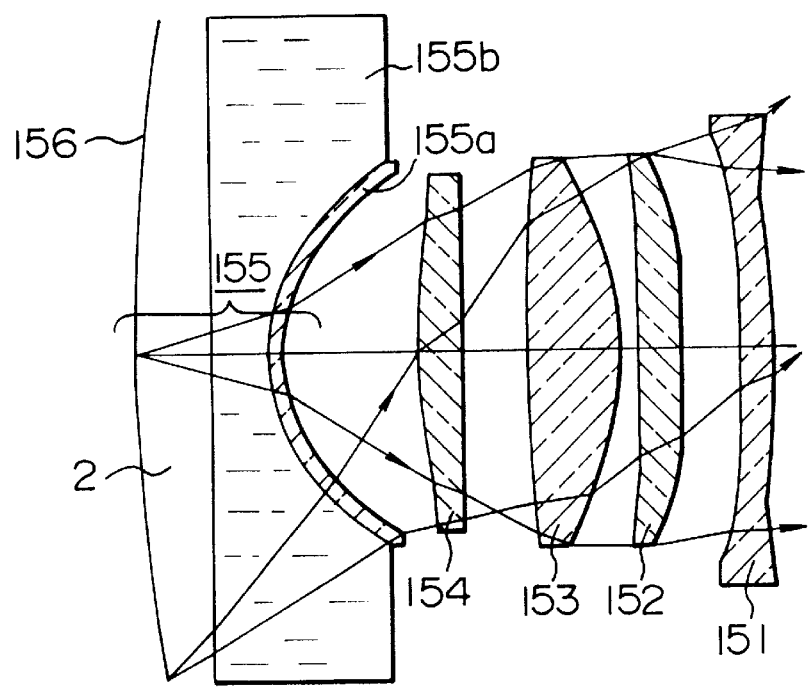
FIG. 9 is a diagram which illustrates a structure of an example of a projection lens of the display apparatus shown in FIG. 1.
Figure 10:
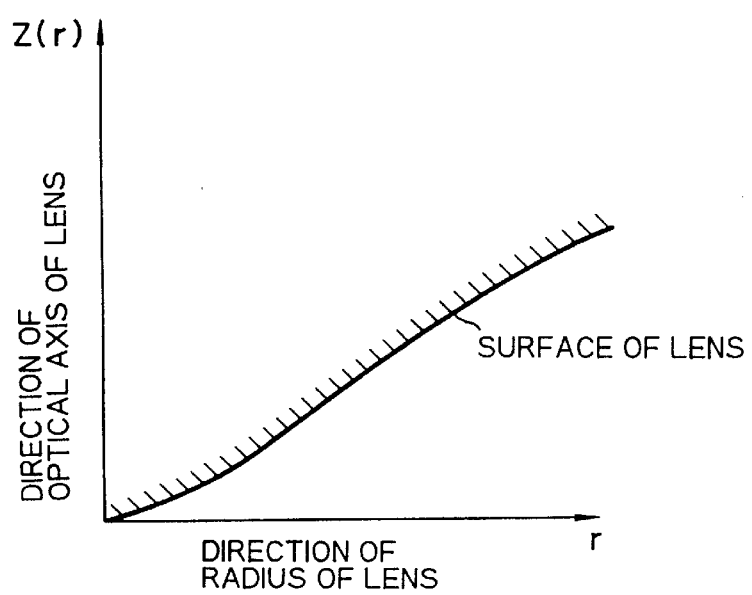
FIG. 10 is a graph showing definition of an aspherical surface.

A first reason is that a projection lens having a very short projection distance is used (as for the projection lens of this type, U.S. patent application Ser. No. 08/241,633 whose assignee is the same is incorporated herein by reference thereto). FIG. 9 illustrates an example of this. The projection lens 3 is characterized in that the projection distance is 590 mm which is very short in a case where the length of the diagonal line is 38 inches as will be described later with reference to FIG. 12.

In FIG. 9 illustrating the example of the structure of the projection lens 3, reference numerals 151, 152, 153, 154 and 155 respectively represent a first lens group, a second lens group, a third lens group, a fourth lens group and a fifth lens group. The fifth lens group 155 comprises a lens 155a and cooling liquid 155b. Reference numeral 156 represents a phosphor surface panel of the projection type cathode-ray tube 2.

Referring further to FIG. 9, the projection lens 3 comprises the first lens group 151, the second lens group 152, the third lens group 153, the fourth lens group 154 and the fifth lens group 155 disposed in order from the transmission type screen (not shown) toward the phosphor surface panel 156 of the projection type cathode-ray tube 2. The first lens group 151 is provided as an aspherical convex lens whose peripheral portion has negative refractive power, the first lens group 151 being disposed such that its apex on the optical axis faces the transmission type screen 7. The second lens group 152 is provided as an aspherical convex lens whose peripheral portion has higher refractive power than that of the central portion, the second lens group 152 being disposed such that its apex on the optical axis, on the contrary, faces the projection type cathode-ray tube 2. The third lens group 153 is provided as a biconvex spherical lens having power of not lower than 70% the total power of the projection lens system. The fourth lens group 154 is provided as an aspherical lens having a biconvex shape at its central portion and a meniscus in the periphery thereof. The fifth lens group 155 is provided as constituted such that cooling liquid 155b is enclosed between a lens 155a and the phosphor surface panel 156 of the projection type cathode-ray tube 2, the fifth lens group 155 having large negative power. The third lens group 153 is a sole glass lens, and the other aspherical lenses, that is, the first lens group 151, second lens group 152, fourth lens group 154 and the fifth lens group 155 are plastic lenses.

Then, a specific example of the projection lens 3 will now be described in a case where the projection lens 3 has an aperture of f/1.0 and a half field of angle of 38 degrees.

A specific example of data of each element (lens groups 151 to 155) according to this embodiment is shown in Table 2, in which "spherical system" means a lens area in the vicinity of the optical axis and "aspherical system" means the outside of the spherical system.

is expressed by the following Equation (1):

$$Z(r) = \frac{r^2/Rd}{1 + \sqrt{1 - (1 + CC) \cdot r^2/Rd^2}} + \quad (1)$$

$$AE \cdot r^4 + AF \cdot r^6 + AG \cdot r^8 + AH \cdot r^{10}$$

where $Z(r)$ in Equation (1) is a surface sag (the function of r) of the lens surface in the Z direction, assuming that the optical axis direction of the lens is Z axis and that the direction of the radius is r axis, and where r is a semi-aperture distance and Rd is a paraxial curvature radius. Therefore, determining coefficients CC, AE, AF, AG and

TABLE 2

Data of Various Parameters of an Example of Projection Lens Shown in FIG. 9

| | Element | | Radius of Curvature Rd (mm) | Surface Distance Th (mm) | Refractive Index |
|---|---|---|---|---|---|
| Spherical System | Screen | | ∞ | 588.000 | |
| | first lens | S1 | 94.354 | 7.282 | 1.49345 |
| | | S2 | 244.49 | 10.123 | |
| | second lens | S3 | −309.09 | 8.084 | 1.49345 |
| | | S4 | −244.490 | 4.277 | |
| | third lens | S5 | 69.329 | 17.900 | 1.62293 |
| | | S6 | −320.900 | 11.900 | |
| | fourth lens | S7 | 29173.000 | 7.425 | 1.49345 |
| | | S8 | −112.820 | 26.584 | |
| | fifth lens | S9 | −41.493 | 3.150 | 1.49345 |
| | | S10 | −42.000 | 10.500 | 1.44712 |
| | Transparent Medium | | ∞ | 14.600 | 1.53994 |
| | Projection type | Face Surface | | | |
| | cathode-ray tube | Phosphor Surface P1 | −350.000 | 0.0 | |

| | | | CC | AE | AF | AG | AH |
|---|---|---|---|---|---|---|---|
| Aspherical System | First Lens | S1 | 0.5316535 | $-2.5776126 \times 10^{-6}$ | $-7.8816131 \times 10^{-10}$ | $6.5850119 \times 10^{-13}$ | $-1.0956883 \times 10^{-16}$ |
| | | S2 | 34.146927 | $-8.0990469 \times 10^{-7}$ | $1.9640913 \times 10^{-9}$ | $-9.1093973 \times 10^{-13}$ | $2.4847187 \times 10^{-16}$ |
| | Second Lens | S3 | 62.521408 | $4.4556364 \times 10^{-6}$ | $6.9585360 \times 10^{-10}$ | $-1.1262206 \times 10^{-12}$ | $3.3280390 \times 10^{-16}$ |
| | | S4 | 38.267715 | $2.6918242 \times 10^{-6}$ | $-1.3990618 \times 10^{-9}$ | $3.2515814 \times 10^{-13}$ | $3.4479614 \times 10^{-17}$ |
| | Fourth Lens | S7 | 0.0 | $-4.1652441 \times 10^{-7}$ | $8.4109431 \times 10^{-9}$ | $1.2359575 \times 10^{-13}$ | $6.8228652 \times 10^{-17}$ |
| | | S8 | 6.3818130 | $1.7404263 \times 10^{-6}$ | $1.0631729 \times 10^{-9}$ | $1.6680190 \times 10^{-12}$ | $-4.6138583 \times 10^{-16}$ |
| | Fifth Lens | S9 | $-1.2049306 \times 10^{-6}$ | $-3.4937502 \times 10^{-6}$ | $1.7553687 \times 10^{-6}$ | $-8.4074230 \times 10^{-13}$ | $-2.0862118 \times 10^{-16}$ |
| | | S10 | 0.0 | 0.0 | 0.0 | 0.0 | 0.0 |

Referring to Table 2, since the transmission type screen 7 (see FIG. 6) is generally in the form of, for example, a plane, its radius of curvature is ∞, and the distance (the surface distance) from the transmission type screen 7 to surface $S_1$ of the first lens group 151 on the optical axis is 588 mm. The radius of curvature of the surface $S_1$ of the first lens group 151 is 94.354 mm, the surface distance from the surface $S_1$ to surface $S_2$ of the first lens group 151 is 7.282 mm, and the index of a part between the two surfaces $S_1$ and $S_2$ is 1.94345. The blank terms of "Refractive Index" indicate that the medium between the surfaces is air (the index of which is 1.0). Similarly, the curvature radius of the phosphor surface $P_1$ of the phosphor surface panel 156 of the projection type cathode-ray tube 2 is −350 mm, the thickness (the surface distance) on the optical axis is 14.6 mm and the index is 1.53994. Note that the "refractive index" herein is a refractive index in case of light having a wavelength of 545 nm.

The surfaces $S_1$ and $S_2$ of the first lens group 151, surfaces $S_3$ and $S_4$ of the second lens group 152, surfaces $S_7$ and $S_8$ of the fourth lens group 154, and surfaces $S_9$ and $S_{10}$ of the fifth lens group 155 are aspherical. The section of the aspherical system in the lower portion of Table 2 shows aspherical coefficient data.

Note that the aspherical coefficient data are values of coefficients CC, AE, AF, AG and AH when the surface shape AH, the height of the lens surface, that is, the lens surface shape can be determined in accordance with the Equation (1).

In FIG. 9, for the lens data of the lens groups 151 to 155 as shown in Table 2, assuming that the power of the total system is $1/f_0$, and that the power of the lens groups are respectively $1/f_1$, $1/f_2$, $1/f_3$, $1/f_4$ and $1/f_5$, relative power $f_0/f_1$ to $f_0/f_5$ with respect to the power of the total system are as follows:

First Lens Group 151:
$f_0/f_1 = 0.230$
Second Lens Group 152:
$f_0/f_2 = 0.0311$
Third Lens Group 153:
$f_0/f_3 = 0.760$
Fourth Lens Group 154:
$f_0/f_4 = 0.311$
Fifth Lens Group 155:
$f_0/f_5 = -0.630$.

The most predominating projection lens upon image-forming is the third lens group 153 having the highest positive power. The other lens groups are aspherical lens groups for correction of aberration. The aspherical lenses except the fifth lens group 155 give positive power to their central portions. The reason for this is that the positive power of the third lens group 153 is more or less distributed to the other groups in order to efficiently correct the spherical aberration.

As shown in FIG. 9, the respective pencils diverged from the central portion and periphery of the phosphor surface panel 156 of the projection type cathode-ray tube 2 are considerably widened greatly before and after the pencils pass through the third lens group 153. Therefore, the first and second lens groups 151 and 152 disposed more adjacent to the transmission type screen 7 (not shown, to be positioned rightward of FIG. 9) than the third lens group 153 precisely control and correct, by aspherical surfaces thereof, the aberration of light beams diverged from object points with respective fields of angles, while the fourth and fifth lens groups 154 and 155 control condition of incidence of the pencils to the first and second lens groups 151 and 152 so as to make easier the correction of the aberration performed by the first and second lens groups 151 and 152.

The functions of the lens groups 151 to 155 will now be described further in detail.

The fifth lens group 155 nearest the phosphor surface panel 156 of the projection type cathode-ray tube 2 is a concave lens, for correcting the curvature of the image plane, comprising the concave lens 155a and the cooling liquid 55b and having high negative power. In cooperation with the curved phosphor surface panel 156 of the projection type cathode-ray tube 2, the fifth lens group 155 defines the position of the passage of the pencil incident on the lens system from each object height so as to correct the curvature of the image plane of the whole lens system 3. The lens 155a has an outlet surface that faces the transmission type screen 7, the outlet surface being formed into aspherical so as to be capable of reducing astigmatism, which is the deviation of the image planes in between the sagital image plane and the meridional image plane at each field of angle. Note that heat generated by the projection type cathode-ray tube 2 is radiated by the cooling liquid 155b.

The fourth lens group 154 comprises an aspherical lens, a central portion of the lens of which is in the form of a biconvex shape, thus having weak positive power for forming an image. Therefore, the central portion is shaped to generate a comatic aberration with respect to a pencil diverged from an object point at a small relative image height of about 0.2 to 0.4. On the other hand, a peripheral portion of the lens is formed into a meniscus shape curved toward the transmission type screen 7 in the direction opposite to that of the central portion, thus having a function to widen, especially toward the marginal portion, a pencil diverged from an object point at a large relative image height of about 0.7 to 1.0. As a result, rays incident from the marginal portion of the raster can be shifted in the direction of the optical axis so that the diameter of the third lens group 153 having the high power can be minimized.

The third lens group 153 is the glass lens having the highest power. In order to somewhat reduce primary spherical aberration, the radius of curvature of the surface facing the transmission type screen 7 is made smaller than that of the surface facing the projection type cathode-ray tube 2.

The second lens group 152 is an auxiliary lens group disposed adjacent to the third lens group 153 and comprises an aspherical lens. A central portion of the lens of the second lens group 152 having weak positive power is formed into a meniscus shape having an apex which faces the projection type cathode-ray tube 2 so as to correct comatic aberration generated by the central portions of the lens of the fourth and third lens groups 154 and 153. The peripheral portion of the second lens group 152, in particular, has a light exiting surface curved in a direction opposite to the direction of the central portion so as to correct higher order spherical aberration. Since the peripheral portion has a positive power higher than that in the central portion of the lens, the peripheral portion act to bend the marginal ray of the pencil diverged from the object point having a large image height.

The first lens group 151 is an aspherical lens, a central portion of which is formed into a convex meniscus shape having an apex facing the transmission type screen 7. The central portion of this lens is curved in a direction opposite that of the central portions of the lenses of the second, third and fourth lens groups 152, 153 and 154 so as to provide negative spherical and comatic aberrations. Thus, the first lens group 151 corrects the positive spherical and comatic aberrations generated by the second, third and fourth lens groups 152, 153 and 154. A peripheral portion of the lens of the first lens group 151 is formed into a biconcave shape and thus it has locally high negative power so as to correct meridional transversal ray aberration diverged from an object point having a relative image height of 0.6 or more in combination with the high positive power of the peripheral portion of the second lens group 152 (that is, serving as a concave lens with respect to a ray or right beam along a large image height and passing through the peripheral portion of the second lens group 152).

In the projection lens 3 having the foregoing structure, the pencils diverged from an object point, of a large image height, at the peripheral portion of the phosphor surface panel 156 of the projection type cathode-ray tube 2 can be widely received so as to maintain peripheral brightness in a sufficiently. Furthermore, a high resolution image can be projected while requiring only a short projection distance. Then, a second reason will now be described, that is, the reason why the rear projection type image display apparatus 1 according to the present invention that comprises parts, the size and number of which are substantially the same as those of the conventional rear projection type image display (except the transmission type screen 7) is able to have a shorter depth as compared with the conventional display apparatus is that the parts are disposed in the rear projection type image display apparatus 1 at higher density.

Initially, dense disposition of the parts, relating to the optical system among the parts in the rear projection type image display apparatus 1, such as the projection type CRT (cathode-ray tube 2), the projection lens 3, the reflecting mirror 4, the coupler 8 and the transmission type screen 7 will now be described.

Figure 11:
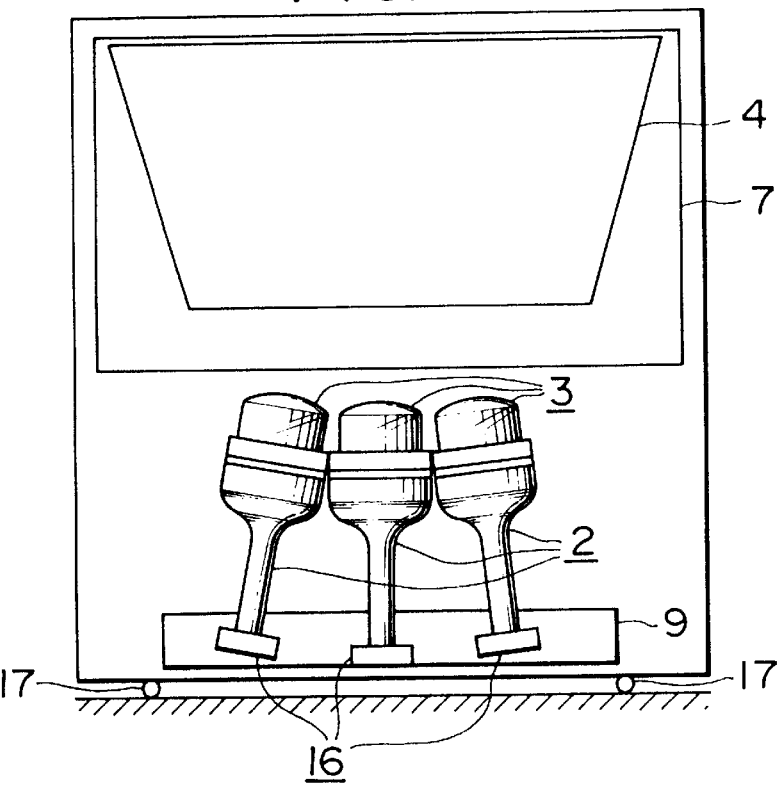
FIG. 11 is a front sectional view which schematically illustrates relationship of positions of parts in the display shown in FIG. 1 relating to the optical system.
Figure 12:
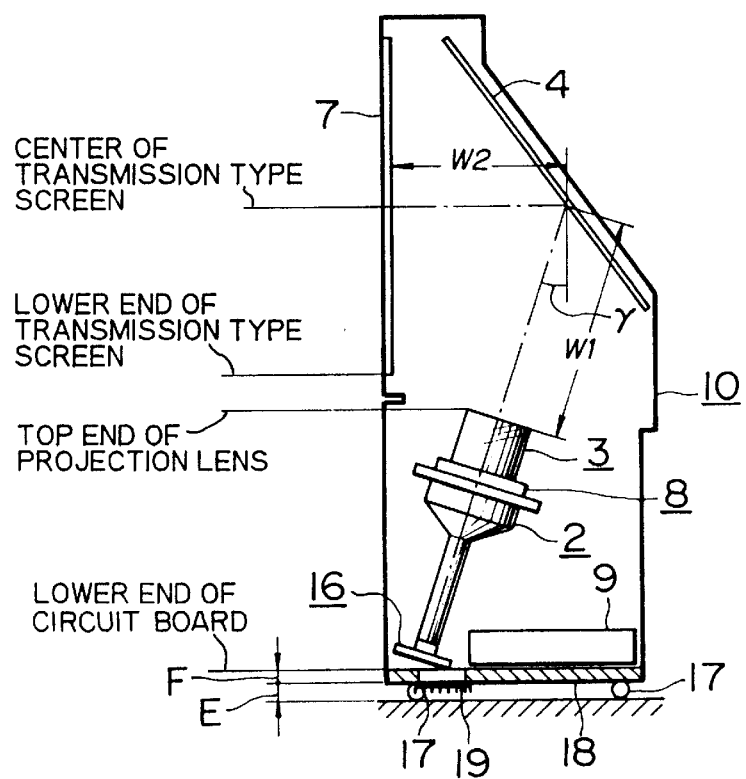
FIG. 12 is a side sectional view which schematically illustrates the relationship of the positions of parts in the display shown in FIG. 1 relating to the optical system.

Referring to FIGS. 11 and 12, the same reference numerals represent the same parts as those shown in FIG. 6. FIGS. 11 and 12 further show a circuit board 16 for the projection type CRT 2 to supply electric power and signals for displaying an image on the projection type cathode-ray tube 2 including components such as the electronic gun having a cathode and electrostatic lens; a caster 17; a base board (a bottom plate) 18 for constituting the housing 10; and a net 19 attached to the base board 18. An electric circuit 9 shown in FIGS. 11 and 12 will be described later in detail.

In this embodiment, the reference raster size with respect to green light from the projection type cathode-ray tube 2 is 5 inches, the distance from the front end surface of the projection lens 3 to the transmission type screen 7 via the reflecting mirror 4, that is, the so-called projection distance $W_1+W_2$ is 590 mm as described above, and the diagonal size of the transmission type screen 7 is 38 inches. Therefore, a magnification ratio of the image by the projection lens 3 is 7.6. Referring to FIG. 12, an angle y of an axis of the projection type cathode-ray tube 2 with respect to the vertical direction is 18 degrees. Since the distance from the front end surface of the projection lens 3 to a surface of the coupler 8 to which the projection type cathode-ray tube 2 is attached is 110 mm, the length of the projection type cathode-ray tube 2 is 256 mm, the diameter of the projection lens 3 is 110 mm, and a width of the circuit board 16 is 75 mm, a height from the top end of the projection lens 3 to the lower end of the circuit board 16 becomes 377 mm. Distance E from a surface of a floor (illustrated with hatching section), on which the rear projection type image display apparatus 1 is placed, to the base board 18 must be 35 mm or longer for the provision of the casters 17. Furthermore, a 20 mm or longer clearance (distance F in FIG. 12) is required below the lower end of the circuit board 16. Therefore, a height from the floor surface to the top end of the projection lens 3 is 432 mm. In order to minimize this height, a portion of the base board 18, which receives the lower end of the circuit board 16, is formed vacant and the net 19 is attached to the lower surface of the base board 18.

Since the height of the center of the transmission type screen 7 is 725 mm as described above, the height of the lower end of the transmission type screen 7 becomes 488 mm. Therefore, the lower end of the transmission type screen 7 comes to be situated at a level higher than the top end of the projection lens 3. One of the reasons of this is that the projection lens 3 has a very short projection distance. As contrasted with this, the conventional rear projection type image display apparatus usually results in that the lower end of the transmission type screen 7 is lower than the top end of the projection lens 3. Other reasons will now be described.

Figure 13:
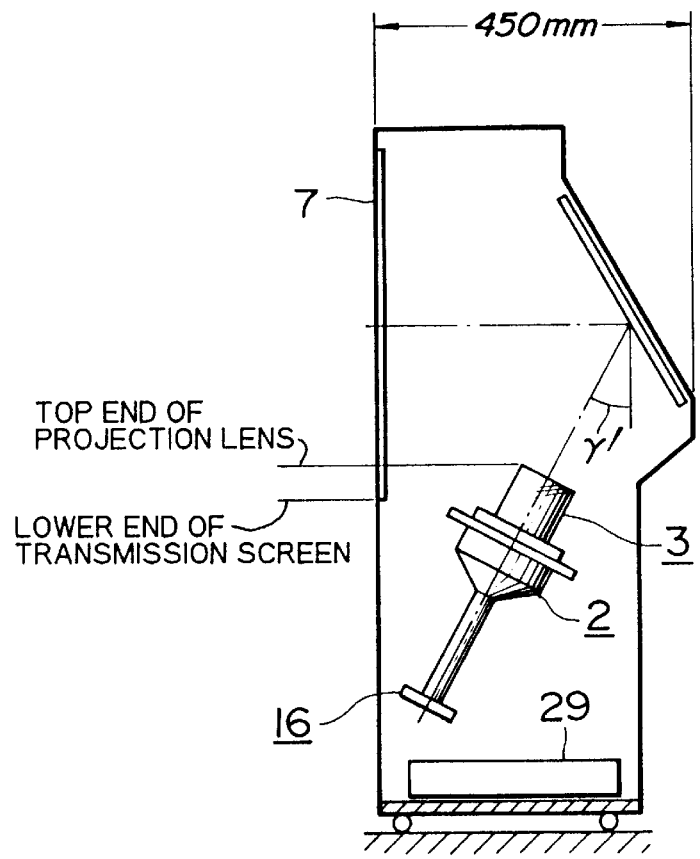
FIG. 13 is a diagram which illustrates a comparative example of disposition of parts to be compared with the disposition of the parts relating to the optical system shown in FIG. 12.
Figure 60:
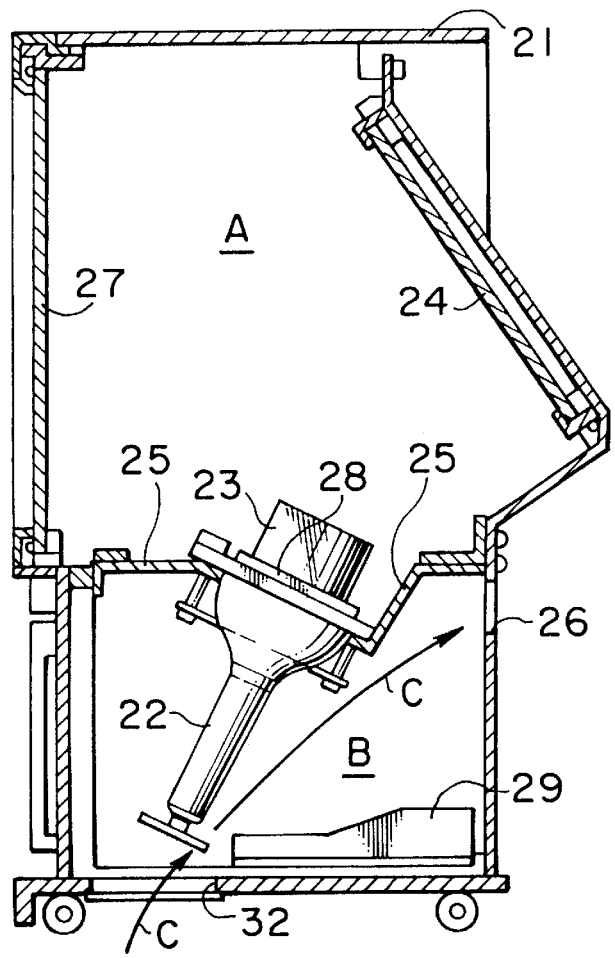
FIG. 60 is a side sectional view which illustrates the display apparatus shown in FIG. 57.

Assuming hypothetically that the electric circuit 29 is disposed below the circuit board 16 for the CRT 2 as shown in FIG. 13, angle γ' between the axis of the projection type cathode-ray tube 2 and the vertical direction must be as large as about 30 degrees. The reason why the projection type cathode-ray tube 2 is inclined to 30 degrees is that, if the projection type cathode-ray tube 2 is inclined to about 18 degrees as shown in FIG. 12, the height of the center of the transmission type screen 7 becomes 750 mm or more, which should be avoided as described before in detail. On the other hand, in FIG. 13, the lower end of the transmission type screen 7 is lower than the top end of the projection lens 3. The way of disposition or arrangement shown in FIG. 13 encounters a problem that the depth of the housing becomes 450 mm, that is longer than the intended value of 400 mm. FIG. 60 accompanying to Japanese Pat. Unexamined Publication No. 2-94784 illustrates a state similar to the that shown in FIG. 12 so far as the positional relationship between the electric board 29 and the projection type cathode-ray tube 22. It is, however, to be noted, that the projection lens in FIG. 60 will not have had so short a projection distance as that of FIG. 12, and therefore that the angle of the axis of the projection type CRT 22 relative to the vertical line is made to be as large as about 30 degree in FIG. 60, which substantially corresponds to displacing the electric circuit 29 of FIG. 13 rearward while increasing a depth of the housing.

Then, the disposition or arrangement, at high density, of the electric system, such as the electric circuit 9 (see FIGS. 11 and 12) enabling the above-mentioned disposition or arrangement of the parts relating to the optical system will now be described.

Referring back to FIG. 12, the electric circuit 9 is disposed on the base board 18 in the lower portion of the housing 10 in parallel to the base board 18. In order to prevent the contact or interference of the circuit 9 with the board 16 for the CRT 2 disposed immediately above the base board 18, the electric circuit 9 has a depth of 300 mm or shorter, and preferably 250 mm or shorter. As a result, the electric circuit can be disposed densely in the housing 10 of the depth of 400 mm or shorter.

Figure 14:
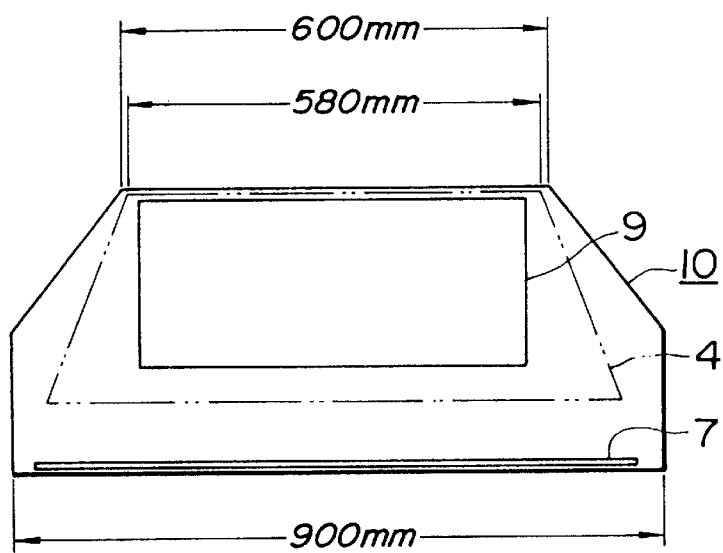
FIG. 14 is a sectional view which schematically illustrates the relationship of the positions of parts in the display shown in FIG. 1 relating to an electric system when viewed from an upper position.

Referring to FIG. 11, the electric circuit 9 has a transverse size or width smaller than a width of the housing 10. The reason for this will now be described with reference to FIG. 14. FIG. 14 illustrates parts among those relating to the optical system, that is, the reflecting mirror 4 (indicated by imaginary lines) and the transmission type screen 7 in addition to the part 9 relating to the electric system.

The rear projection type image display apparatus usually has the reflecting mirror 4 to shorten the depth of the housing 10 as described above. Since the reflecting mirror 4 is, as shown in FIG. 12, obliquely disposed at an intermediate position of an optical path formed from the projection lens 3 to the transmission type screen 7, an effective portion of the reflecting mirror 4 becomes in the form of a trapezoid. Therefore, employment of the trapezoid reflecting mirror 4 (refer to FIG. 11 showing the state of attachment of the mirror 4 when viewed from the front position and FIG. 14 showing the state of the attachment when viewed from an upper position) will not raise any problem. Thus, reduction of the width at the lower end (the rear end) of the reflecting mirror 4 to be substantially the same as the width of the electric circuit 9 will enable to reduce the width of the rear portion of the housing 10 as shown in FIG. 14.

It is preferable to minimize the size of the rear portion of the housing 10 because of the reason to be described below, while the significant reduction of the size of the rear portion of the electric circuit 9 may result in the reduction in the size of the electric circuit 9. Such being the case, it may be necessary that a separate or divided circuit for performing a part of functions of the circuit 9 (refer to, for example, a circuit board 43 shown in FIG. 30) be disposed at another position. The reason for this is that the size reduction is limited because the major volume of the electric circuit 9 is composed of parts, such as a power supply circuit, that cannot easily be reduced in size and parts, such as the deflection circuit, which generate relatively lays heat and cannot generally integrated. Even if the divided circuit is provided, reduction of the rear portion of the housing 10 to an inside of the reflecting mirror 4 is physically inhibited. Since the size of the reflecting mirror 4 is 580 mm in this embodiment, the size of the rear portion of the housing 10 can not be reduced to less than 600 mm because a clearance gap is required for the reflecting mirror 4.

Figure 15:
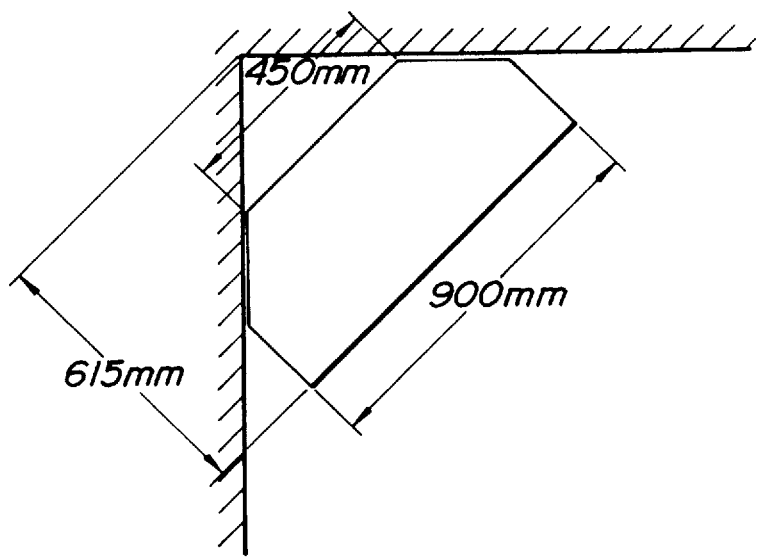
FIG. 15 is a schematic view which illustrates an rear projection type image display apparatus according to an embodiment of the present invention when viewed from an upper position similarly to FIG. 14.
Figure 16:
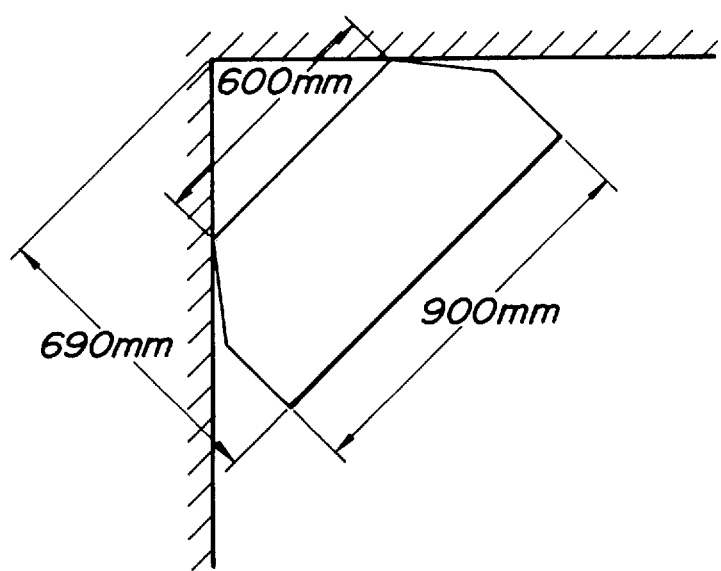
FIG. 16 is a schematic view of the display shown in FIG. 14 when viewed from an upper position.

The reason why size reduction of the rear portion of the housing 10 is desired as much as possible will now be described with reference to FIGS. 15 and 16. The size of the rear portion of the housing 10 is reduced to 450 mm in the structure shown in FIG. 15, which is shorter than the maximum reduction to 600 mm according to this embodiment. Thus, FIG. 15 is, of course, a view only for the convenience of explanation. If the rear portion of the housing 10 were reduced to 450 mm as shown in FIG. 15, the housing 10 could be received just within the corner having an angle of 90 degrees, thus enabling a distance from the end of the corner to the surface of the transmission type screen 7 to be a minimum distance of 615 mm. In a case where the reduction of the rear portion of the housing 10 is 600 mm in the embodiment shown in FIG. 14, the distance from the end of the corner having the angle of 90 degrees to the surface of the transmission type screen 7 is 690 mm as shown in FIG. 16, thus resulting in an amount of further projection of 75 mm. However, the inventors of the present invention consider that the projection of 75 mm does not raise substantial problem. The reason for this will now be described by a comparison with a case where a direct view type image display device is installed in a corner having the angle of 90 degrees.

Figure 17:
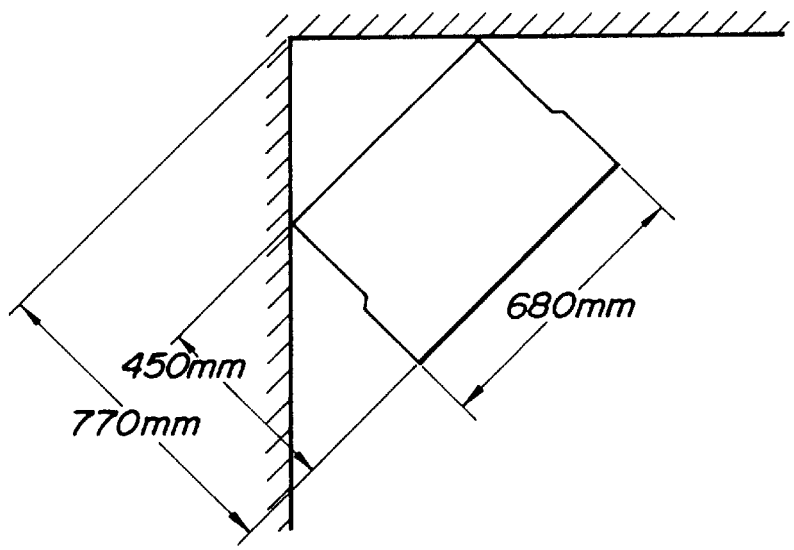
FIG. 17 is a view which schematically illustrates a state where a 29-inch direct view type image display device having a depth of 450 mm is installed at a corner having an angle of 90 degrees.
Figure 18:
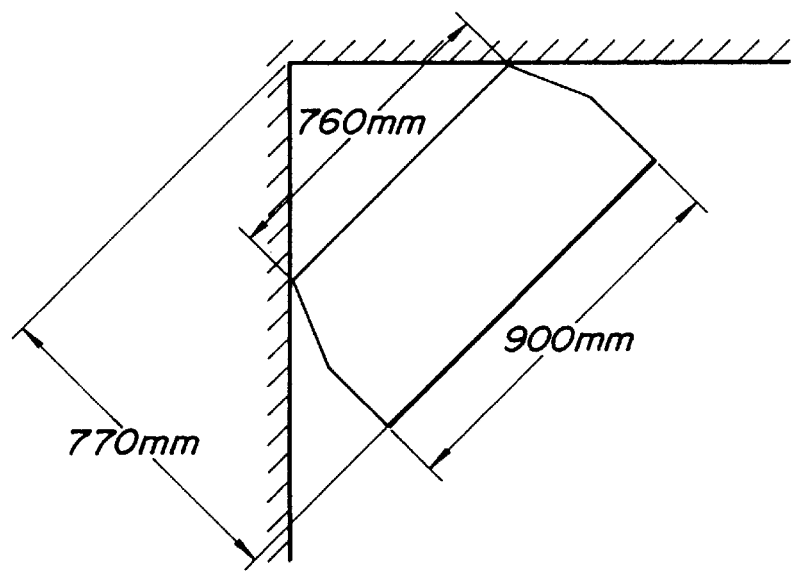
FIG. 18 is a view which schematically illustrates a state where a rear projection type image display apparatus according to an embodiment of the present invention and having a housing, a rear portion of which is reduced to 760 mm is installed at a corner having an angle of 90 degrees when viewed from an upper position.

FIG. 17 is a top view which illustrates a state where a 29-inch direct view type image display device having a depth of 450 mm is installed at the corner having the angle of 90 degrees. As can be understood from FIG. 17, the distance from the end of the corner having the angle of 90 degrees to a front face of a cathode-ray tube (not shown) is 770 mm. This means that the distance from the end of the corner having the angle of 90 degrees to the surface of the transmission type screen 7 being 770 mm or shorter in the case where the rearwardly width-reduced or tapered rear projection type image display apparatus is installed in the corner having the angle of 90 degrees enables the 29-inch direct view type image display device to be replaced by the rearwardly width-reduced 38-inch rear projection type image display apparatus without a problem or feeling of physical disorder. Therefore, the size or width of the rear portion of the rearwardly width-reduced housing 10 of the rear projection type image display apparatus must be 760 mm or less. It is, of course, preferable to minimize the size of the rear portion of the housing 10 because the distance from the end of the corner to the surface of the transmission type screen 7 can be shortened in proportion to a degree of reduction in the size or width of the rear portion of the housing 10. Thus, a ratio of the width-reduced size at the rear end of the housing with respect to the width at a front portion of the housing is preferred to be within a range of 0.67 to 0.84.

Figure 19:
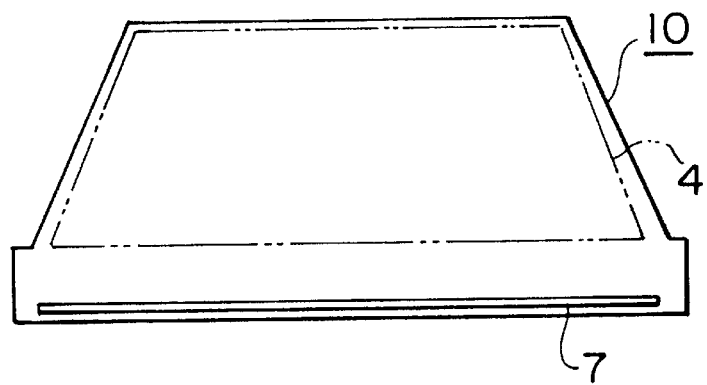
FIG. 19 is a view which schematically illustrates a rear projection type image display apparatus according to an embodiment of the present invention and having a housing, a rear portion of which is reduced into another shape when viewed from an upper position.

Although the rear portion of the housing 10 is, in FIG. 14, reduced straight from substantially the central portion in the direction of the depth of the housing 10, the same may be reduced inwards as shown in FIG. 19 so far as the same does not contact or interfere the reflecting mirror 4 (indicated by imaginary lines) and path of rays (not shown).

The electric circuit 9 according to the present invention has, in order to reduce the size of the rear portion of the housing 10 of the rear projection type image display apparatus 1 the width between 740 mm (corresponding to the width (760 mm) of rear portion of the housing 10 enabling to provide an effect of rearwardly reduced width) and 580 mm (not smaller than the minimum width of the reflecting mirror 4, that is, the width of the lower end of the mirror 4).

As described above, the parts relating to the optical system and the electric system are densely disposed so that the depth of the rear projection type image display 1 is shortened as compared with the conventional rear projection type image display apparatus. Since the rear projection type image display apparatus 1 according to the present invention is enabled to have the reduced height and depth, it can be displaced more easily from the portion of installation to clean the rear side thereof than the conventional display apparatus.

The reason why the back cover 15 is formed into an integral body integrated part in the structure shown in FIG. 8 which schematically illustrates the parts of the housing 10 of the rear projection type image display 1 is based on the consideration of the above-mentioned way of treatment or use. Since the integrated-type back cover 15 has the structure described with reference to FIG. 8 such that the upper portion and the lower portion are formed into the integral body and that the side surfaces and the top cover are also formed integrally, the back or rear surface of the apparatus can be trimmed in terms of design without a seam or connection thus minimizing dust accumulation. Therefore, an advantage can be obtained in that the display apparatus can easily be cleaned.

Figure 20:
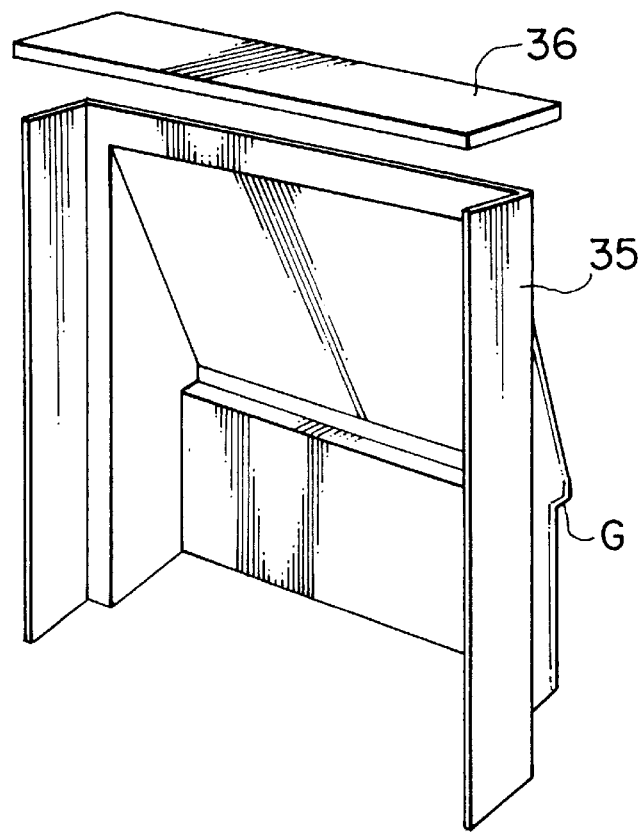
FIG. 20 is an exploded perspective view which illustrates another example of the back cover of the display apparatus shown in FIG. 1.
Figure 21:
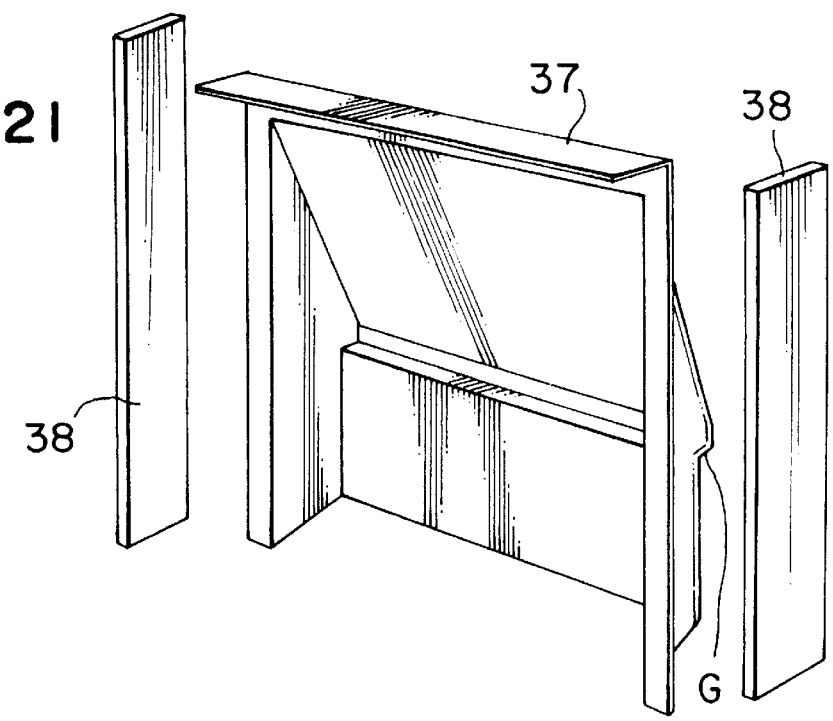
FIG. 21 is an exploded perspective view which illustrates still another example of the back cover of the display apparatus shown in FIG. 1.

FIGS. 20 and 21 illustrate two modifications of the back cover of the rear projection type image display apparatus 1 shown in FIG. 1. FIG. 20 illustrates an example in which the back cover is composed of two parts consisting of: a back cover 35 having upper and lower portions of the housing and side surfaces of the housing which are integrally formed; and a top tray 36 for covering the top surface of the housing. FIG. 21 illustrates an example in which the back cover is composed of three parts consisting of: a back cover 37 having the upper and lower portions of the housing and the top surface of the housing which are integrally formed; and two side panels 38 for covering the side surfaces of the housing. In both examples, the back surface of the apparatus can be trimmed in terms of design and dust accumulation can be minimized because of omission of a seam as compared with the case where the upper and lower back covers are separately formed.

Each of the back covers shown in FIGS. 8, 20 and 21 has a step G, significance of which will now be described.

Figure 22:
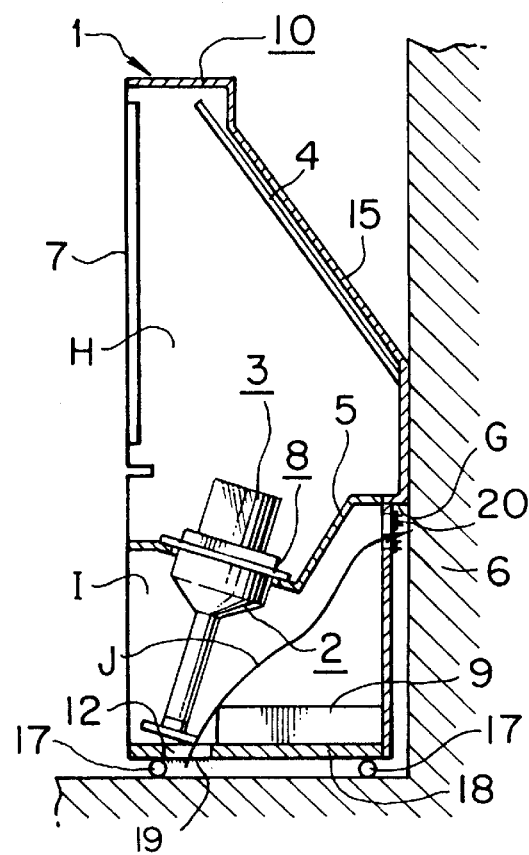
FIG. 22 is a schematic vertical sectional view which illustrates a state where the display apparatus shown in FIG. 1 is installed along a wall without any gap.
Figure 23:
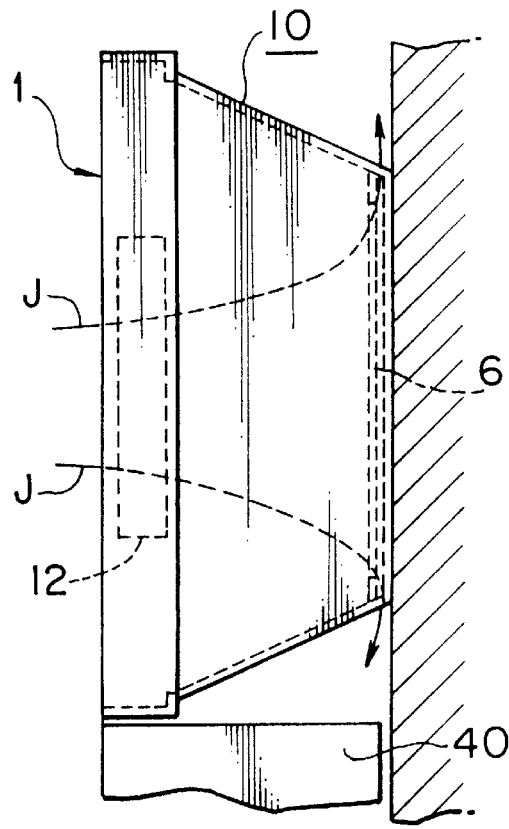
FIG. 23 is a top schematic view which illustrates the display apparatus of FIG. 22.

Referring to FIG. 22 which illustrates a state where the rear projection type image display apparatus 1 is disposed without any gap from the wall of a room, the inside of the housing 10 is vertically divided into two spaces H, J by metallic setting parts 5 of couplers 8. In an upper space H, non-heat-generating parts, such as the coupler 8, the projection lens 3, the reflecting mirror 4 and the transmission type screen 7, are disposed, the upper space H being basically formed into a sealed structure. In a lower chamber I, at least the projection type cathode-ray tube 2 and the electric circuit 9, which are heat-generating parts, are disposed, the lower chamber I being basically formed into an opened structure so as to be cooled. Ventilation for cooling is performed through a ventilating passage or air flow passage J from a convection air inlet 12 in the base board 18 constituting the bottom portion of the housing 10 to a convection air outlet 6 in the back cover 15 constituting the housing 10. Reference numerals 19 and 20 represent nets attached respectively to the convection air inlet 12 and outlet 6). Since the rear projection type image display apparatus 1 comprises the back cover 15 that has the step G, installation of the rear projection type image display apparatus without any gap from the wall (designated by a hatching section) does not cause the ventilating passage J to be covered with the wall as shown in FIGS. 22 and 23. If furniture 40 is installed side by side without any gap from the rear projection type image display apparatus 1 as shown in FIG. 23, the reduction in the rear portion of the housing 10 prevents covering of the air flow passage J with the furniture 40.

In a case where satisfactory cooling performance cannot be obtained because the electric circuit 9 generates large heat or because of the reasons such as, impossibility of forming a large convection air outlet 6 in the back cover 15 due to the extreme reduction in the rear portion of the housing 10, the following structure will overcome the problem.

Figure 24:
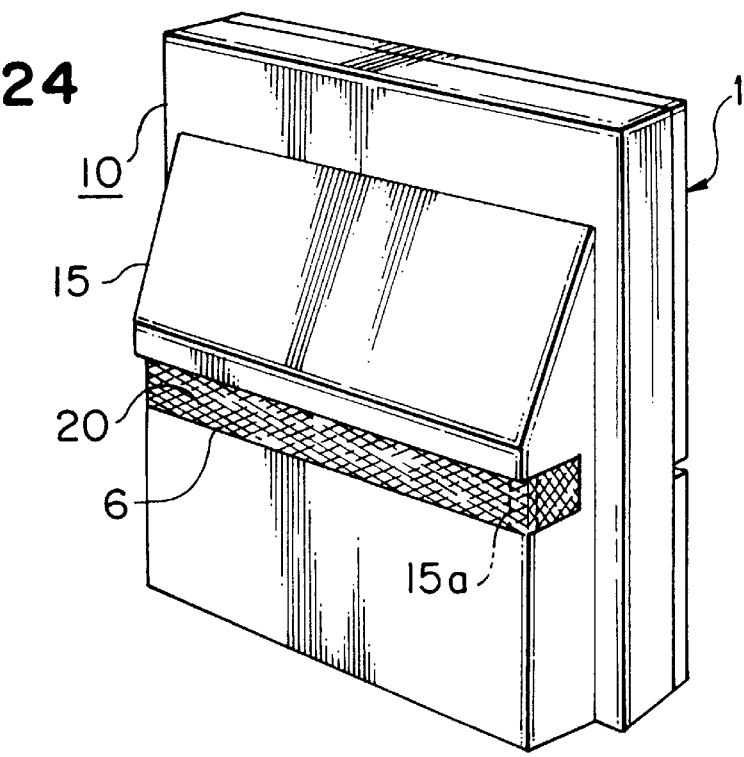
FIG. 24 is a schematic view which illustrates a rear projection type image display apparatus according to another embodiment of the present invention when viewed from a diagonally rear position.

A first method or measure is to utilize an area of the side surfaces of the back cover to enlarge the area of the convection air outlet. As can be understood from FIG. 24 which illustrates another example of the rear projection type image display apparatus 1, the convection air outlet 6 in the back cover 15 constituting the housing 10 is formed now to reach the side surfaces of the back cover 15 as well as the back surface of the back cover 15. Reference numeral 20 denotes a net for protection. In this case, the ventilating performance of the rear projection type image display apparatus 1 according to the present invention can be further improved. Although FIG. 24 shows one-round type or continuously extending open portion in the back surface and the side surfaces, provision of columnar portions 15a in the corners of the cover 15 as indicated by imaginary lines to provide the opened portion individually in the back surface and the side surfaces will not change the effect.

A second method or measure will now be described with reference to FIGS. 25, 26, 27, 28 and 29.

Figure 25:
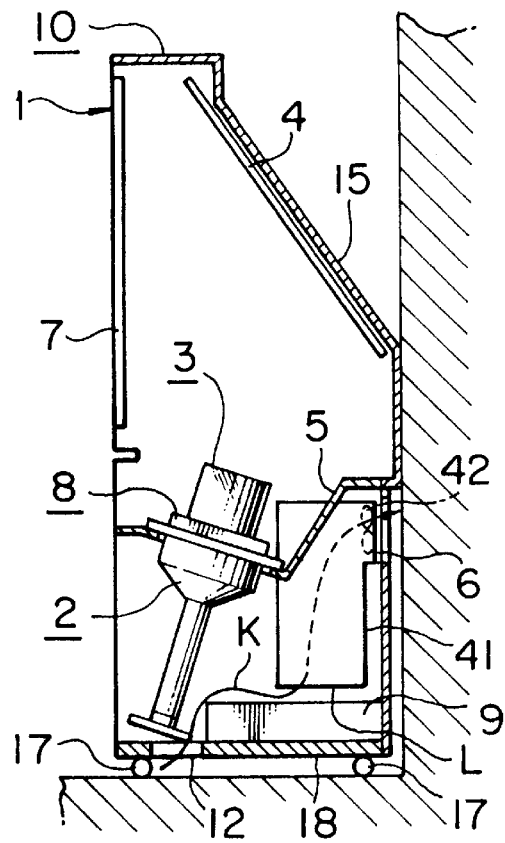
FIG. 25 is a schematic vertical sectional view which illustrates a state where a rear projection type image display apparatus according to still another embodiment of the present invention is installed along a wall without any gap.
Figure 26:
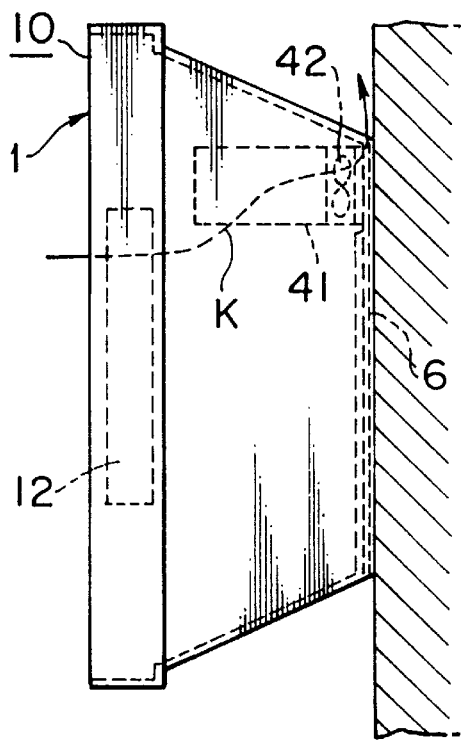
FIG. 26 is a top schematic view which illustrates the state of installation shown in FIG. 25.

Referring to FIGS. 25 to 29, the same reference numerals as those shown in FIG. 22 represent the same parts. In FIG. 25, an air duct 41 and an electric fan 42 are added to the structure shown in FIG. 22. Heat generated from the electric circuit 9 is, by the air duct 41 having, at an outlet thereof, the electric fan 42, absorbed to the outside of the housing 10 through an air flow passage K. Therefore, concentric disposition of the electric parts constituting the electric circuit 9, that generate large heat, in an inlet portion L of the air duct 41 improves the cooling efficiency. Even if air is flown out by the electric fan 42 through the rear surface of the housing 10 as shown in FIG. 26, the presence of the step G at the back cover 15 enables satisfactory cooling effect to be obtained. However, if there is a risk that a portion of air blown out by the electric fan 42 flows back into the housing 10 through the convection air outlet 6 to raise excessively the temperature in the housing 10, employment of the following means will effectively overcome the problem.

Figure 27:
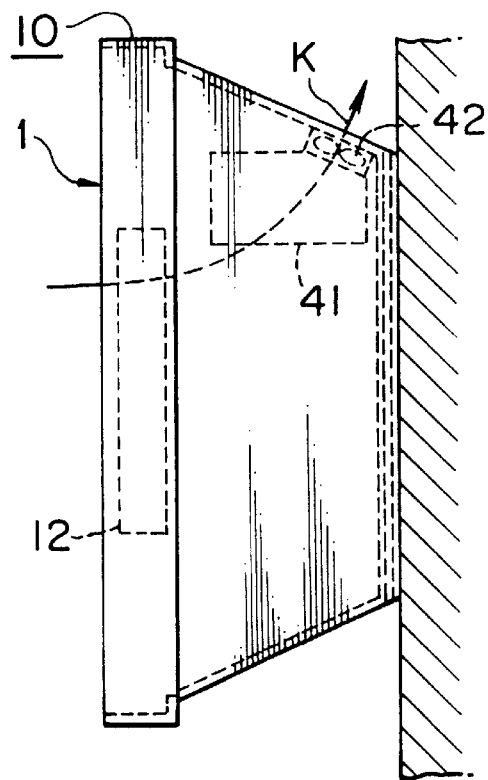
FIG. 27 is a top schematic view which illustrates a state where a rear projection type image display apparatus according to still another embodiment of the present invention and having an electric fan that flows out air from a side surface of the housing is installed along the wall without any gap.
Figure 28:
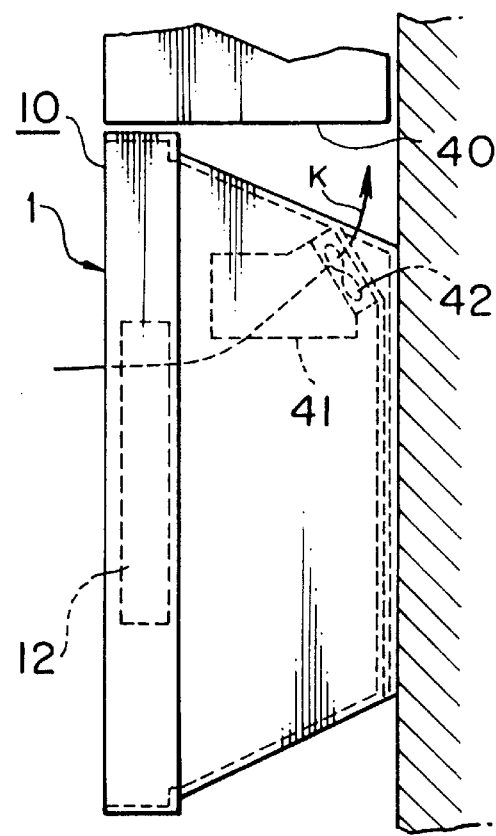
FIG. 28 is a top schematic view which illustrates a state where a rear projection type image display apparatus according to still another embodiment of the present invention and having the electric fan that flows out air from an edge between the rear surface and a side surface of the housing is installed along the wall without any gap.
Figure 29:
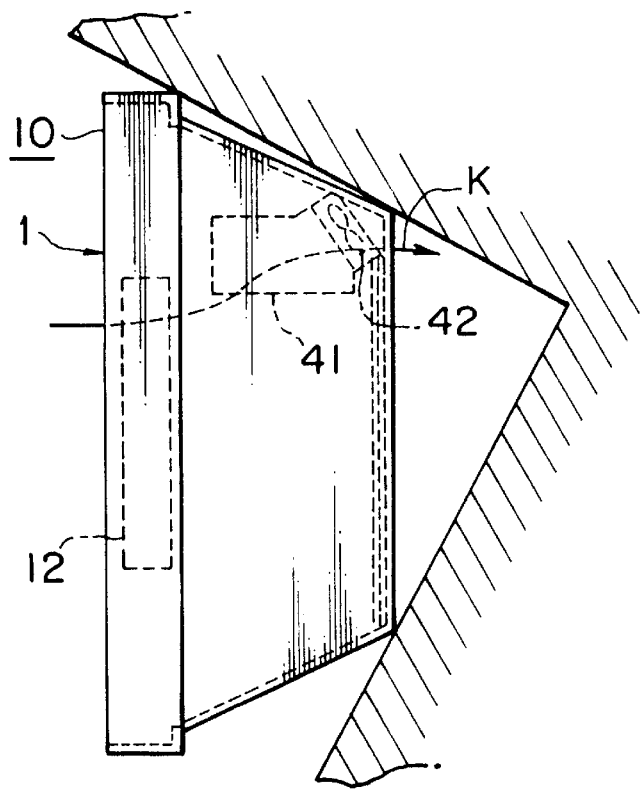
FIG. 29 is a top schematic view which illustrates a state where a rear projection type image display apparatus according to still another embodiment of the present invention and having the electric fan that flows out air from an edge between the rear surface and a side surface of the housing is installed within a corner of a room with one of the surfaces having the electric fan along the wall without any gap.

FIG. 27 illustrates an example in which the electric fan 42 flows out an air through the side surfaces of the housing 10. In this case, even if the rear projection type image display apparatus 1 is installed along the wall without any gap therefore, cooling air passes through an air flow passage K to be flown out by the electric fan 42.

Figure 30:
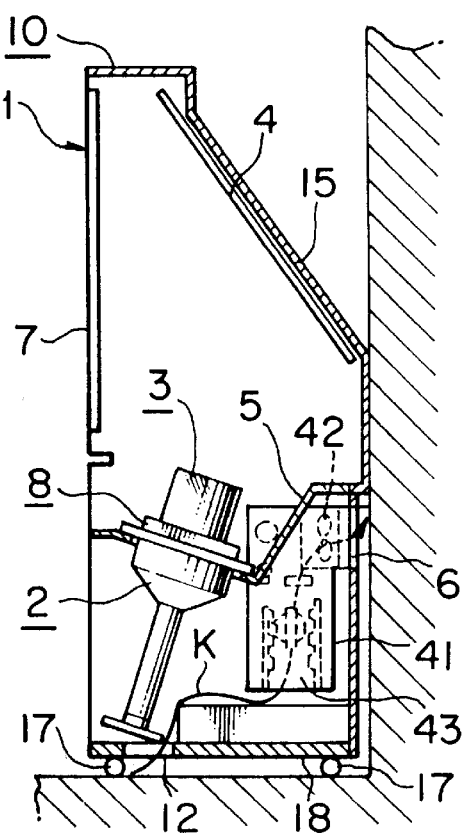
FIG. 30 is a vertical sectional view which schematically illustrates a state where a rear projection type image display apparatus according to still another embodiment of the present invention is installed along the wall without any gap.
Figure 31:
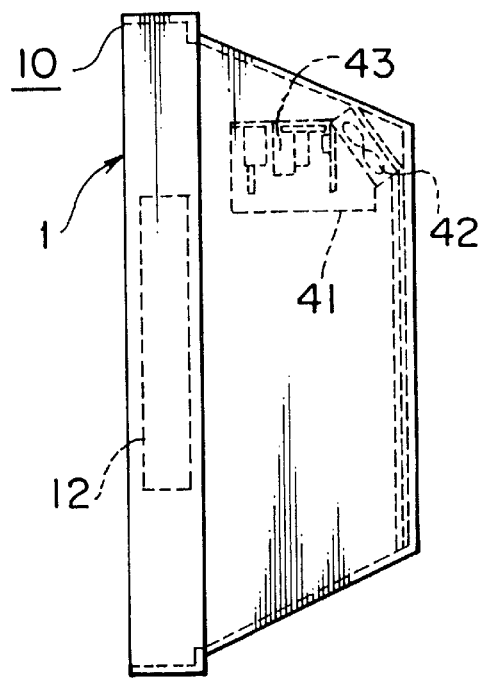
FIG. 31 is a top schematic view which illustrates the state of installation shown in FIG. 30.

Referring to FIGS. 30 and 31 which illustrate still another embodiment of the rear projection type image display apparatus 1 according to the present invention, the same reference numerals represent the same parts as those shown in FIG. 25. The difference from the structure shown in FIG. 25 is that an electric power supply (circuit board) 43 forms or is mounted on one of the surfaces of the air duct 41. Thus, the electric power supply portion, which generates largest heat and cooling of which is, therefore, most fully required, can be cooled sufficiently. Although FIGS. 30 and 31 illustrate the example in which the electric power supply 43 is accommodated in the air duct 41, other heat generating parts such as a convergence amplifier (not shown) and a deflection electric circuit (not shown) may be accommodated in the duct 41. The duct 41 may be elongated to accommodate all parts that generate large heat.

Figure 32:
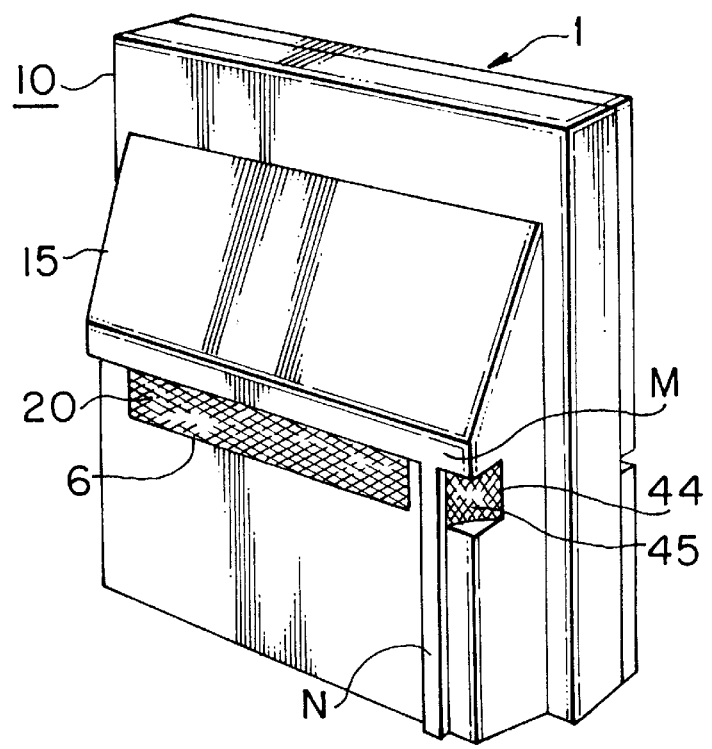
FIG. 32 is a schematic view which illustrates a modification of the display apparatus shown in FIG. 30 when viewed from a diagonally rear position.

Referring to FIG. 32 which illustrates a modification of the rear projection type image display apparatus 1 of FIG. 30, an electric fan outlet (or foreced convection air outlet or convection air outlet for air duct) 44 is formed individually from the convection air outlet 6 such that they are completely separated from each other in the horizontal direction by a projection N having the same height as a portion M which is brought into contact with the wall when the housing 10 is installed along the wall without any gap. As a result of the foregoing structure, even if the rear projection type image display apparatus 1 shown in FIG. 32 is installed along the wall without any gap, a portion of air flown out by the electric fan (not shown) does not flow back into the housing 10 through the convection air outlet 6, thus preventing a problem in that the temperature in the housing 10 is raised.

Although the cooling methods or systems shown in FIGS. 25 to 31 provide an excellent cooling effect, a space for a loud speaker chamber one side of the rear projection type image display apparatus is reduced, and thus the capacity or volume of the loud speaker chamber is reduced undesirably. If the acoustic field response of the right loud speaker chamber is made to be same as that of the left loud speaker chamber by providing the same capacity or volume of right and left loud speaker chambers, a low frequency range of the audio signal cannot easily be reproduced. In the rear projection type image display 1 having the housing 10 whose height is considerably reduced, a vertical space for provision therein of the speakers, i.e. from the lower and of the transmission type screen to the floor, is limited due to a predetermined height of the center of the screen. Inventors have found that if it is assumed that the speakers for medium to low ranges are mounted in the lower half of the space for the speakers in view of appearance or design and stable appearance, increase in the reflection from the floor deteriorates the clearness of the sound. In order to solve the above-mentioned two newly found problems, the rear projection type image display 1 has the following structure paying attention to a fact that person's sense of hearing a low frequency range of sound is almost lacking in directivity.

Figure 33:
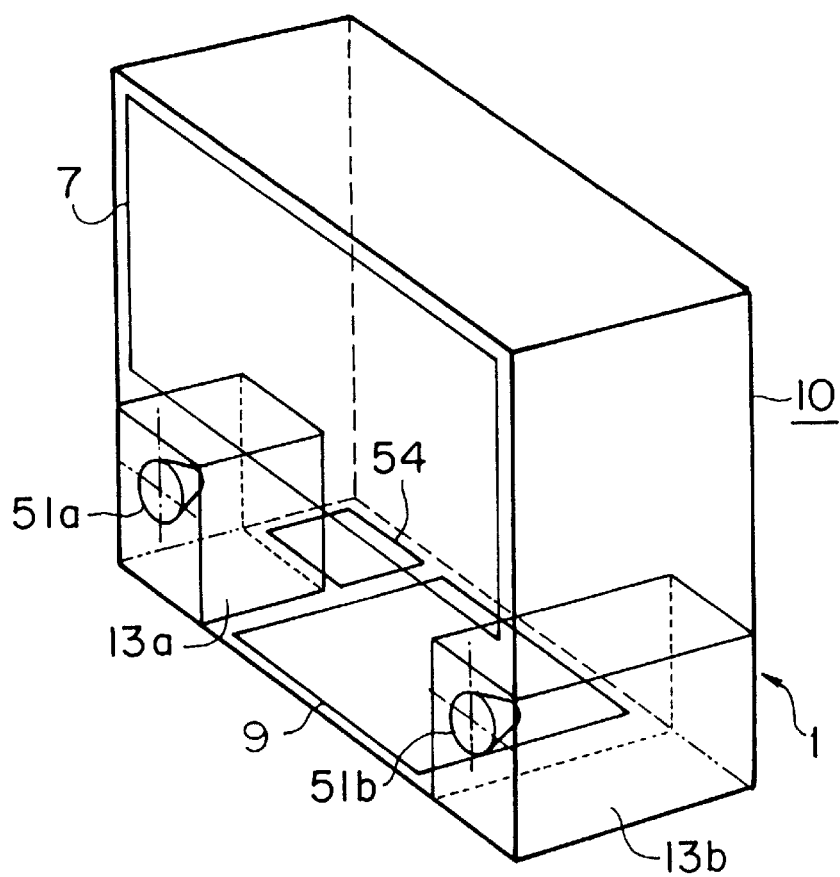
FIG. 33 is a diagrammatic view which illustrates a structure of an embodiment of a sound reproducing system of the rear projection type image display apparatus according to the present invention.
Figure 34:
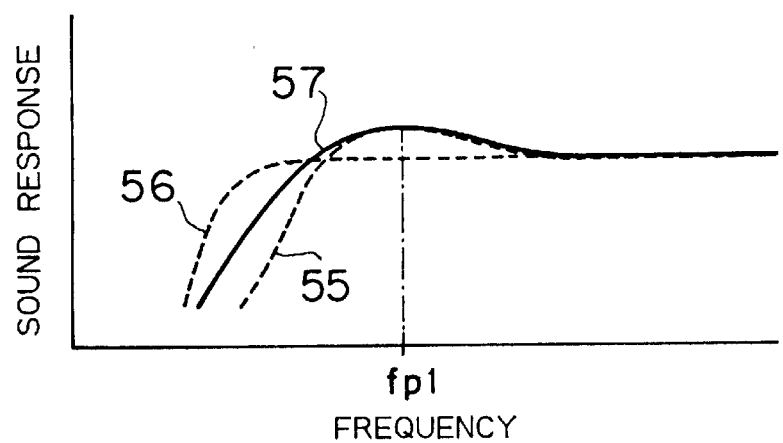
FIG. 34 is a characteristic graph showing the operation of the sound reproducing system shown in FIG. 33.

FIG. 33 illustrates an embodiment of a sound reproducing system of the rear projection type image display apparatus 1. In order to simply describe the structure, parts that are not related to the description are omitted from illustration. Furthermore, the housing is simply illustrated in the form of a rectangular box (hereinafter illustrated similarly). In FIG. 33, the rear projection type image display apparatus 1 comprises, the housing 10, the transmission type screen 7, speaker chambers 13a and 13b and speaker units 51a and 51b. Reference numeral 53 represents a region for installing the board of the electric circuit 9, and 54 represents a region for installing the duct 41. The speaker unit 51a and loud speaker chamber 13a constitute a first sound reproducing system, while the speaker unit 51b and the loud speaker chamber 13b constitute a second sound reproducing system. In this structure, the capacity or volume of the loud speaker chamber 13a most be smaller than the capacity or volume of the loud speaker chamber 13b. The acoustic field response obtainable from the loud speaker chambers having thus asymmetrical capacities will now be described with reference to FIG. 34. FIG. 34 shows sound power frequency response radiated from the speaker units 51a and 51b. The sound power frequency response by speaker unit 51a and the loud speaker chamber 13a is indicated by a frequency-dependent response 55. If the influence of stiffness by the capacity of the speaker chamber 13a becomes significant on the vibratory system of the speaker unit 51a, the frequency-dependent response is somewhat raised at a low frequency range (the peak frequency: fP1). The frequency response realized by the speaker unit 51b and the loud speaker chamber 13b is indicated by a frequency-dependent response 56. When a monophonic signal (a signal having the same phase angle and the same amplitude) is supplied to the speaker units 51a and 51b, a frequency-dependent response 57 substantially intermediate between the frequency response 55 and the frequency response 56 is obtained at a position in front of the housing 10 and spaced by the same distance from the speaker units 51a and 51b. In general, components of the bass range cannot be sensibly heard by a person in terms of the direction. Therefore, no problem takes place whether the sound is reproduced by the speaker unit 51a or 51b.

Figure 35:
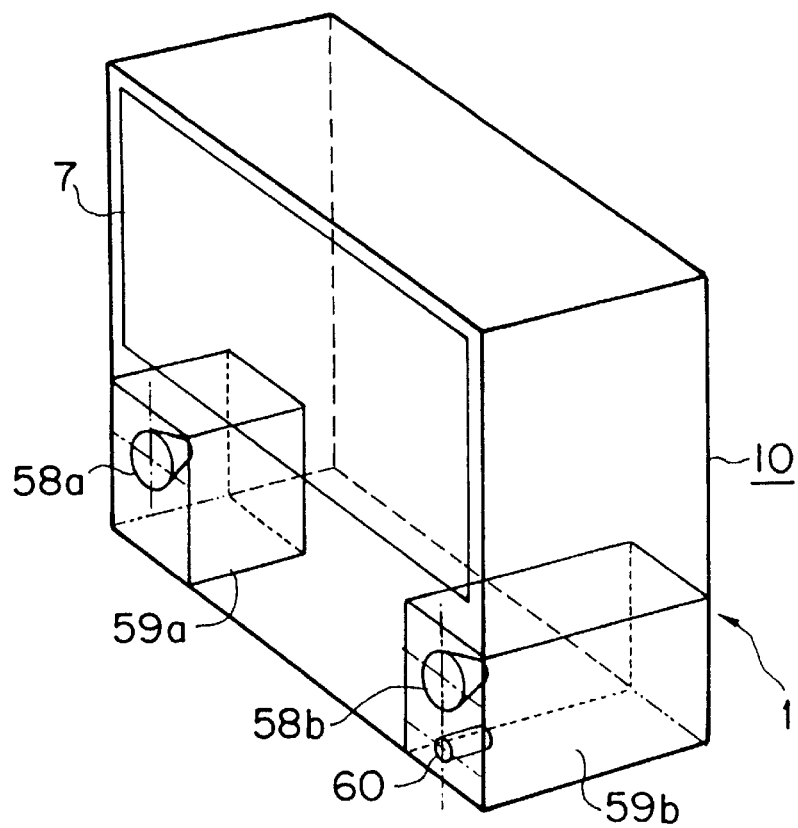
FIG. 35 is a diagrammatic view which illustrates a structure of another embodiment of a sound reproducing system of the rear projection type image display apparatus according to the present invention.
Figure 36:
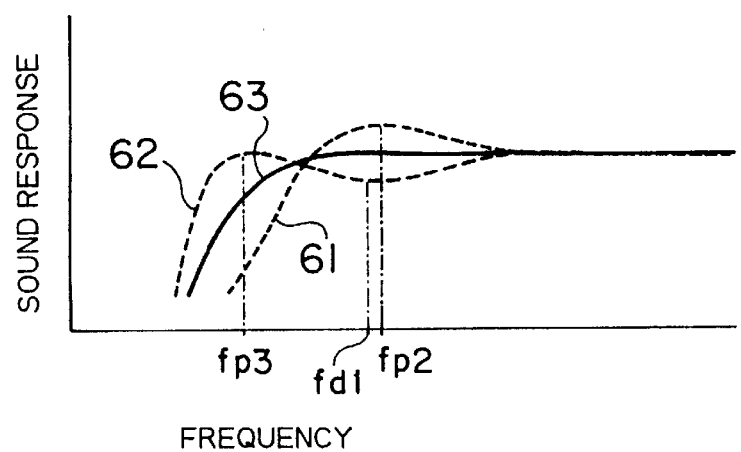
FIG. 36 is a characteristic graph showing the operation of the sound reproducing system shown in FIG. 35.

FIG. 35 illustrates another embodiment of the sound reproducing system of the rear projection type image display apparatus 1 according to the present invention. In FIG. 35, the same reference numerals represent the same parts as those in FIG. 33. A speaker unit 58a and a loud speaker chamber 59a constitute a first sound reproducing system, while a speaker unit 58b, a loud speaker chamber 59b and a port tube 60 constitute a second sound reproducing system. In this embodiment, the loud speaker chamber having a smaller capacity or volume is in the form of an enclosed-cabinet type, while the loud speaker chamber having a larger capacity or value is in the form of a bass-reflex cabinet type having a port tube 60. The frequency-dependent response reproduced by the loud speaker chambers 59a and 59b having asymmetric capacities as shown in FIG. 35 will now be described with reference to FIG. 36. FIG. 36 shows the accoustic power frequency response radiated from the speaker unit 58a, the speaker unit 58b and the port tube 60. The frequency response obtainable from the speaker unit 58a and the loud speaker chamber 59a is indicated by a frequency-dependent response 61. If the influence of stiffness by the capacity of the speaker chamber 59a becomes significant on the vibratory system of the speaker unit 58a, a frequency-dependent response is somewhat raised at a low frequency range (the peak frequency: fP2). The sound power frequency response obtainable from the speaker unit 58b, the loud speaker chamber 59b and the port tube 60 is indicated by a frequency-dependent response 62. The frequency response 62 can be changed variously by changing the capacity of the loud speaker chamber 59b and the resonant frequency of the port tube 60 with respect to various parameters of the speaker unit 58b. If the resonant frequency of the port tube 60 is set to a low level, a peak fp3 and a dip fd1 are generated. When a monophonic signal (a signal having the same phase angle and the same amplitude) is supplied to the speaker units 58a and 58b, a frequency-dependent response 63 substantially intermediate between the frequency response 61 and the frequency response 62 is obtained. Since the two frequency responses 61, 62 compensate with each other, it is possible to easily realize a flat frequency response in this embodiment, as compared with the foregoing embodiment, and to have the similar effect to that obtainable from the same.

Figure 37:
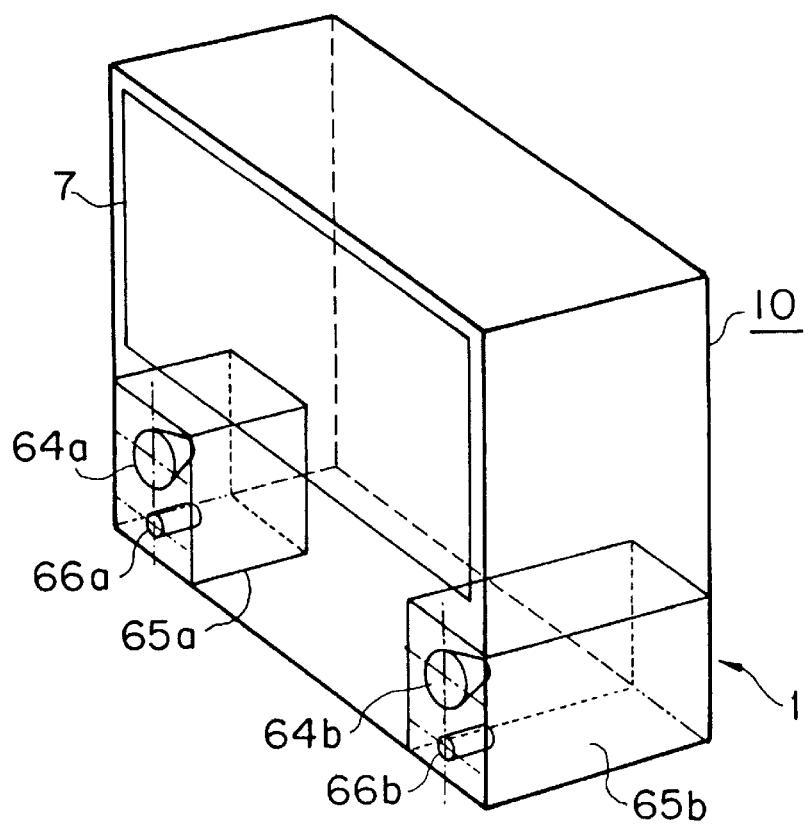
FIG. 37 is a diagrammatic view which illustrates a structure of still another embodiment of a sound reproducing system of the rear projection type image display apparatus according to the present invention.

FIG. 37 illustrates still another embodiment of the sound reproducing system of the rear projection type image display apparatus 1 according to the present invention. In FIG. 37, the same reference numerals as those shown in FIG. 33 represent the same parts.

Figure 38:
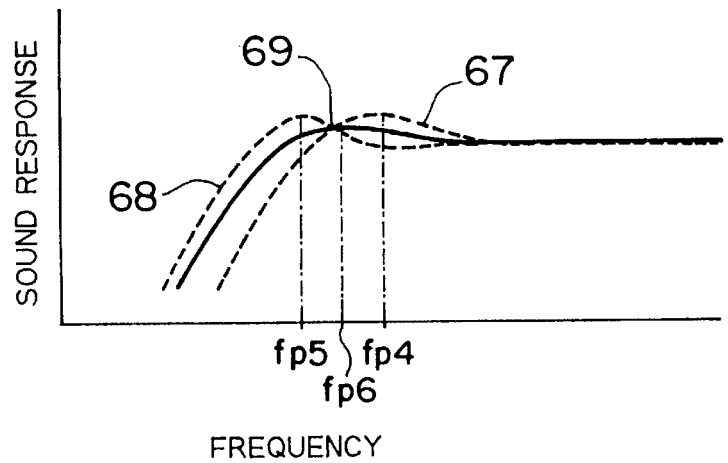
FIG. 38 is a characteristic graph showing the operation of the sound reproducing system shown in FIG. 37.

Referring to FIG. 37, a speaker unit 64a, a loud speaker chamber 65a and a port tube 66a constitute a first sound reproducing system, while a speaker unit 64b, a loud speaker chamber 65b and a port tube 66b constitute a second sound reproducing system. In this embodiment, both smaller-volume loud speaker chamber and the larger-volume loud speaker chamber are in the form of bass-reflex cabinet type having port tubes 66a and 66b. The frequency-dependent response reproduced by the loud speaker chambers having asymmetric capacities shown in FIG. 37 will now be described with reference to FIG. 38. FIG. 38 shows the accoustic power frequency response radiated from the speaker unit 64a, the port tube 66a, the speaker unit 64b and the port tube 66b. The sound power frequency response obtainable from the speaker unit 64a, the loud speaker chamber 65a and the port tube 66a is indicated by a frequency-dependent response 67. The sound power frequency response obtainable from the speaker unit 64b, the loud speaker chamber 65b and the port tube 66b is indicated by a frequency-dependent response 68. The frequency responses 67 and 68 can be changed variously by changing the volumes (capacities) of the loud speaker chambers 65a and 65b and the resonant frequencies of the port tubes 66a and 66b with respect to various parameters of the speaker units 64a and 64b. The foregoing change may be selected as desired. For example, in a case where the sizes of the port tube such as an area of an aperture of the port, a length of the port tube and the like are not changed and where (the capacity of the loud speaker chamber 65a)<(the capacity of the loud speaker chamber 65b), peaks fp4 and fp5 having the relationship fp4>fp5 are generated in the respective sound power frequency responses. When a monophonic signal (a signal having the same phase angle and the same amplitude) is supplied to the speaker units 64a and 64b, a frequency-dependent response 69 can be obtained. Since their frequency responses 67 and 68 compensate with each other, a peak fp6 can be obtained, thus enabling the dip, liable to generated in the frequency response 68, to be suppressed Simultaneously enable to reproduce a bass range to be widened relative to the frequency response 67. As contrasted with the above-mentioned two embodiments, this embodiment has a characteristic that the sound reproducing system has ports 66a and 66b and therefore a degree of freedom in design is permitted. Thus, a desired frequency-dependent response can easily be realized with respect to the capacities of the loud speaker chambers 65a and 65b. Furthermore, a similar effect to that obtainable from the above-mentioned two embodiments can be obtained.

Figure 39:
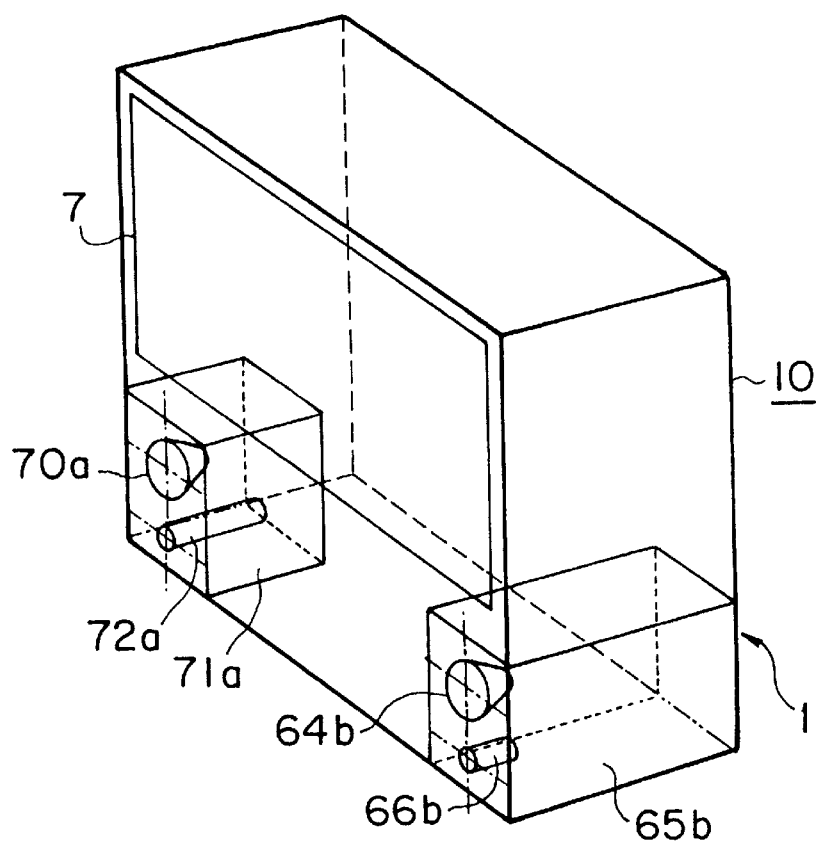
FIG. 39 is a diagrammatic view which illustrates a structure of still another embodiment of a sound reproducing system of the rear projection type image display apparatus according to the present invention.

FIG. 39 illustrates still another embodiment of the sound reproducing system of the rear projection type image display apparatus 1 according to the present invention. In FIG. 39, the same reference numerals represent the same parts as those shown in FIG. 33. Referring to FIG. 39, a speaker unit 70a, a loud speaker chamber 71a and a port tube 72a constitute a first sound reproducing system, while a speaker unit 64b, a loud speaker chamber 65b and a port tube 66b constitute a second sound reproducing system. In this embodiment, both smaller-capacity loud speaker chamber and the larger-capacity loud speaker chamber are in the form of the bass-reflex cabinet type similarly to the embodiments shown in FIG. 37 and 38. However, this embodiment has a characteristic that a length of the port tube 72a attached to the smaller-capacity loud speaker chamber 71a is longer than a length of the port tube 66b attached to the larger-capacity loud speaker chamber 65b. The difference of this embodiment from the embodiment shown in FIGS. 37 and 38 will now be described with reference to FIGS. 39 and 40. The frequency-dependent response 68 is the same, while the accoustic power frequency response obtainable from the speaker unit 70a, the loud speaker chamber 71a and the port tube 72a is indicated by a frequency-dependent response 73, where the relationship fp7<fp4 is held. In this embodiment, attenuation characteristics of the two responses 68 and 73 in a frequency range lower than fp5 (a region indicated by a circle 74) can be allowed to approach to each other. As a result, although a total or overall frequency-dependent response 75 has an approximate relationship fp6=fp8, the descending characteristic in the bass range can be made more moderate. Thus, rich bass sound can be reproduced. This embodiment has the port tubes of different lengths in contrast to the embodiment shown in FIGS. 37 and 38. The design can be performed freely similarly to the embodiment of FIGS. 37 and 38 and thus the similar effect can be obtained.

Figure 40:
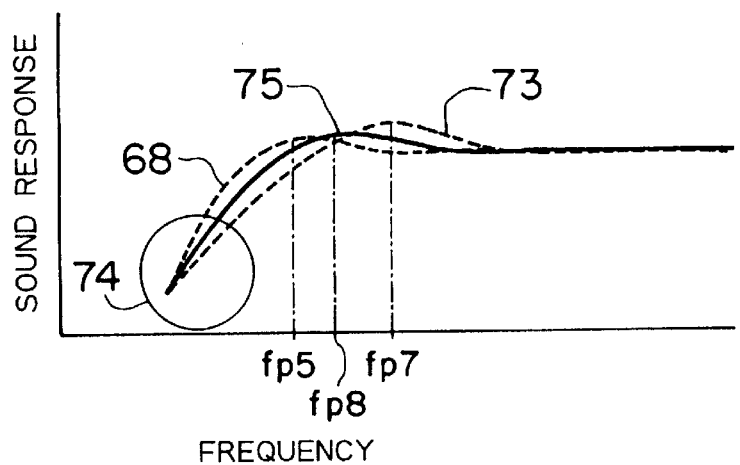
FIG. 40 is a characteristic graph showing the operation of the sound reproducing system shown in FIG. 39.
Figure 41:
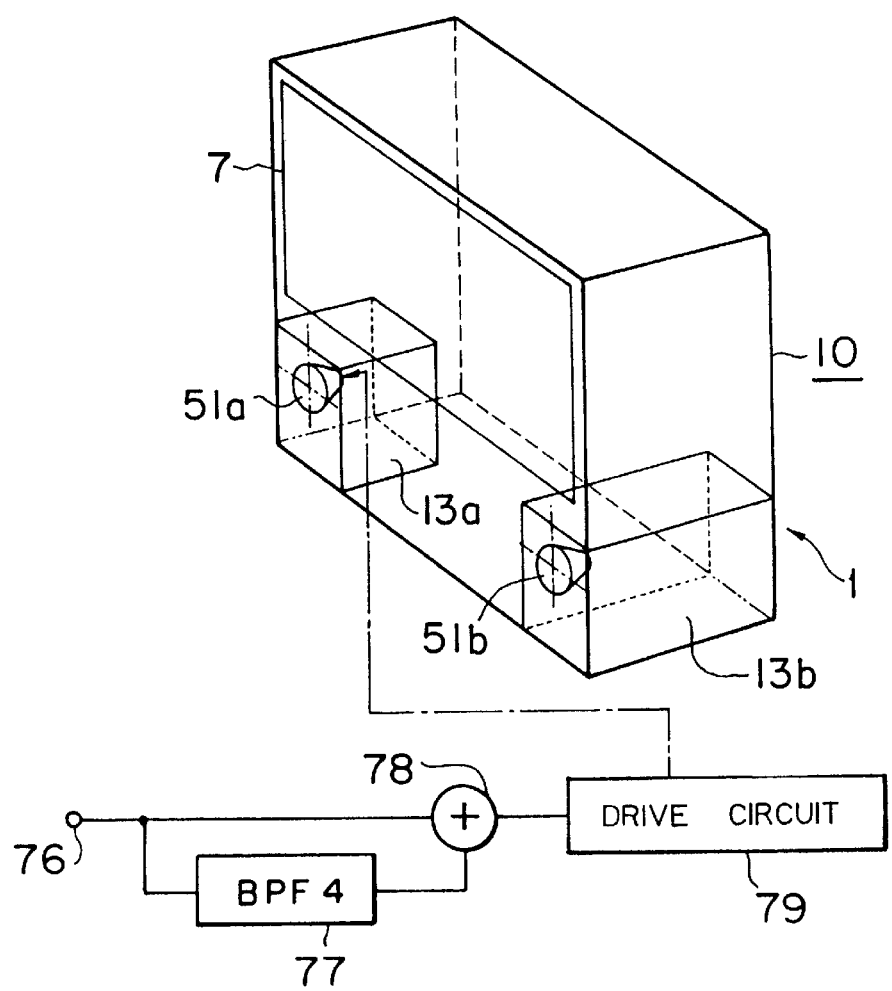
FIG. 41 is a diagrammatic view which illustrates a structure of an embodiment of a drive circuit for the sound reproducing system of the rear projection type image display apparatus according to the present invention.
Figure 42:
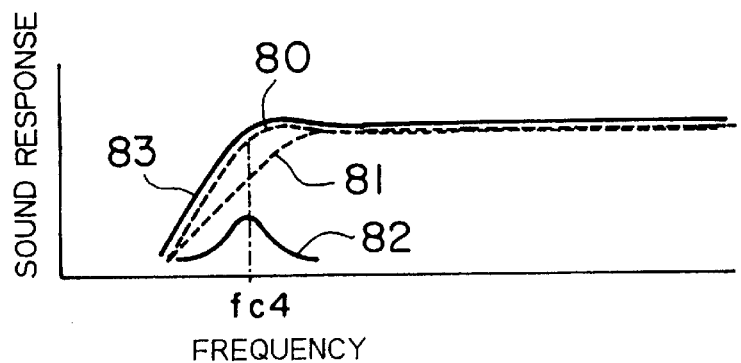
FIG. 42 a characteristic graph showing the operation of the sound reproducing system shown in FIG. 41.

Referring to FIG. 41 which illustrates an embodiment of the sound reproducing system of the rear projection type image display apparatus 1 according to the present invention, the same reference numerals as those shown in FIG. 33 represent the same parts. The sound reproducing system according to this embodiment comprises the housing 10, the transmission type screen 7, the loud speaker chambers 13a and 13b, the speaker units 51a and 51b, an audio signal input terminal 76, a band pass filter (BPF4) 77, an adder circuit 78 and a drive circuit 79. The band pass filter 77 and the adder circuit 78 constitute a peaking circuit for emphasizing the bass range of the audio signal. Then, the operation will now be described. FIG. 42 shows the sound power reproduced by the speaker units 51a and 51b and the frequency-dependent characteristics or response in the frequency range of the band pass filter 77. An assumption is now made that the sound power frequency response reproduced by the speaker unit 51b is a frequency-dependent response 80. Since the loud speaker chamber 13a has a capacity smaller than that of the loud speaker chamber 13b, a frequency-dependent response 81 thereof is obtained. When a frequency-dependent response of the peaking circuit is set as indicated by a response 82, a frequency-dependent response as designated by a response 83 can be realized. The frequency response 83 is selected to be substantially the same as the frequency response 80 so that substantially the same synthesized or total sound power frequency response can be realized. The low frequency range peaking circuit shown in FIG. 41 may be applied to each of the embodiments shown in FIGS. 37 and 39 in which the smaller-capacity loud speaker chamber is the bass-reflex cabinet type. In this case, the phase angles and the sound power frequency response of the right and left sound reproducing systems can be made identical with each other so that the synthesized sound power frequency response shown in FIGS. 38 and 40 are improved (the sound power level in the bass range is raised).

Figure 43:
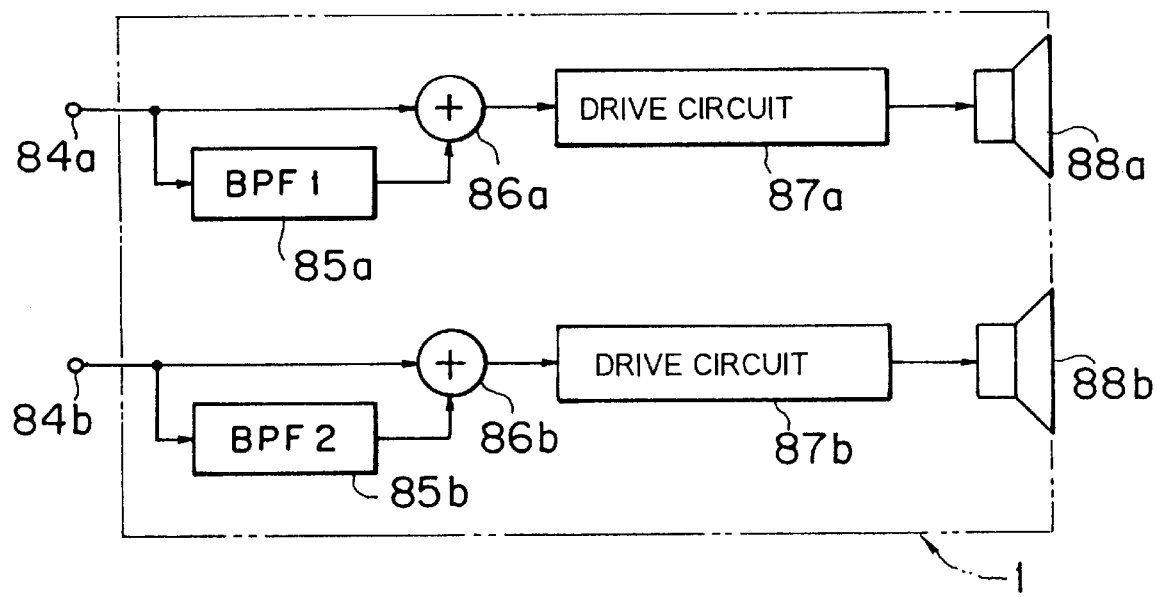
FIG. 43 is a diagram which illustrates a structure of another embodiment of a drive circuit for the sound reproducing system of the rear projection type image display apparatus according to the present invention.
Figure 44:
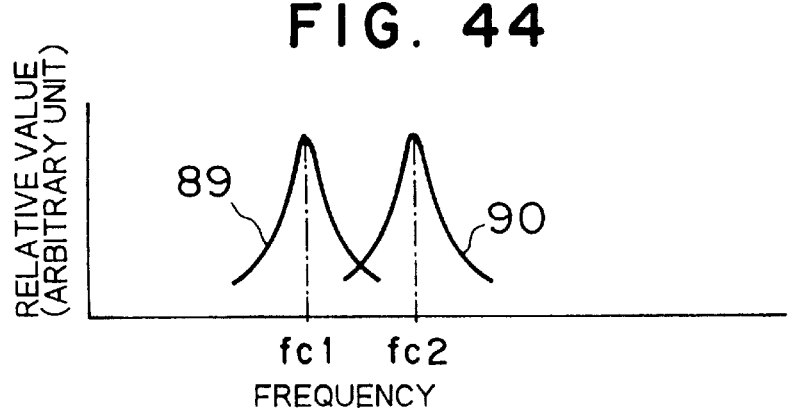
FIG. 44 is a characteristic graph showing frequency characteristics of band pass filters shown in FIG. 43.
Figure 45:
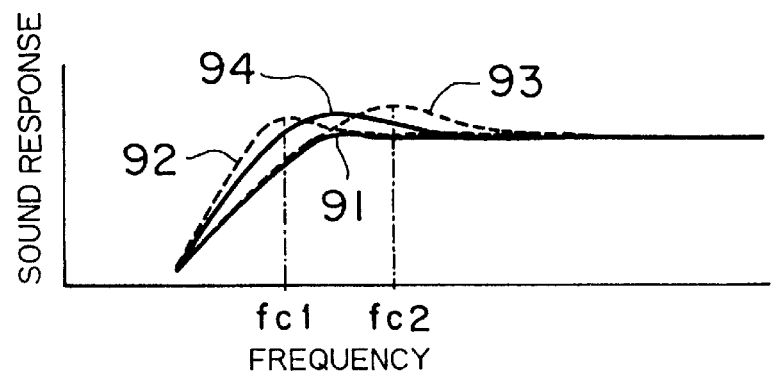
FIG. 45 is a characteristic graph showing the operation of the sound reproducing system shown in FIG. 43.

The improvement in the sound power frequency response which is liable to be deteriorated due to the structure that one of the loud speaker chambers has a smaller capacity can be made by correction by means of an electric circuit as well as by the above-mentioned improvement in the sound reproducing system. FIG. 43 illustrates an embodiment of the former way of correction. A structure of this embodiment comprises audio signal input terminals 84a and 84b, a first band pass filter (BPF1) 85a, a second band pass filter (BPF2) 85b, adder circuits 86a and 86b, output or drive circuits 87a and 87b and speaker units 88a and 88b. In this embodiment, an external terminal 84a (84b) is a left (right) audio input terminal, while a speaker unit 88a (88b) is a left (right) sound reproducing system. Then, the operation of the circuit will now be described with reference to FIGS. 44 and 45. FIG. 44 is a graph showing a frequency-dependent response of the band pass filter and FIG. 45 is a graph showing the acoustic field response reproduced by the speaker unit. The frequency response of the first (second) band pass filter 85a (85b) is set to a response 89 (90). The responses 89 and 90 have different center frequencies fc1 and fc2 in the passing band thereof. The audio range indicated by the response 89 (90) of an audio signal supplied through the external terminal 84a (84b) is detected, and is added by the adder circuit 86a (86b) to the input audio signal to drive the speaker unit 88a (88b) through the output or drive circuit 87a (87b). Assuming that the frequency-dependent response of the speaker units 88a and 88b is as indicated by a response 91, the input audio signal supplied through the terminal 84a is convented into the form of a response 92 emphasized around the center frequency fc1. The input audio signal supplied through the terminal 84b is converted into the form of response 93 emphasized around the center frequency fc2. Thus, in this embodiment, because the frequency-dependent response of the speaker unit 88a can be expanded much wider to the bass or low-frequency range, than that of the speaker unit 88b, the improvement in the frequency-dependent responce of the sound power liable to be deteriorated in the case where one of the speaker chamber-pair is smaller in its capacity or volume. By appropriately determining fc1 and fc2 to correspond to the accoustic power frequency response of the speaker units 88a and 88b, emphasis in the frequency range different from that in a conventional tone control circuit can be performed. Since this embodiment employs the means different from the above-mentioned improvement by the sound reproducing system per se, combined use of this embodiment with the any of the above-mentioned embodiments can be made.

Figure 46:
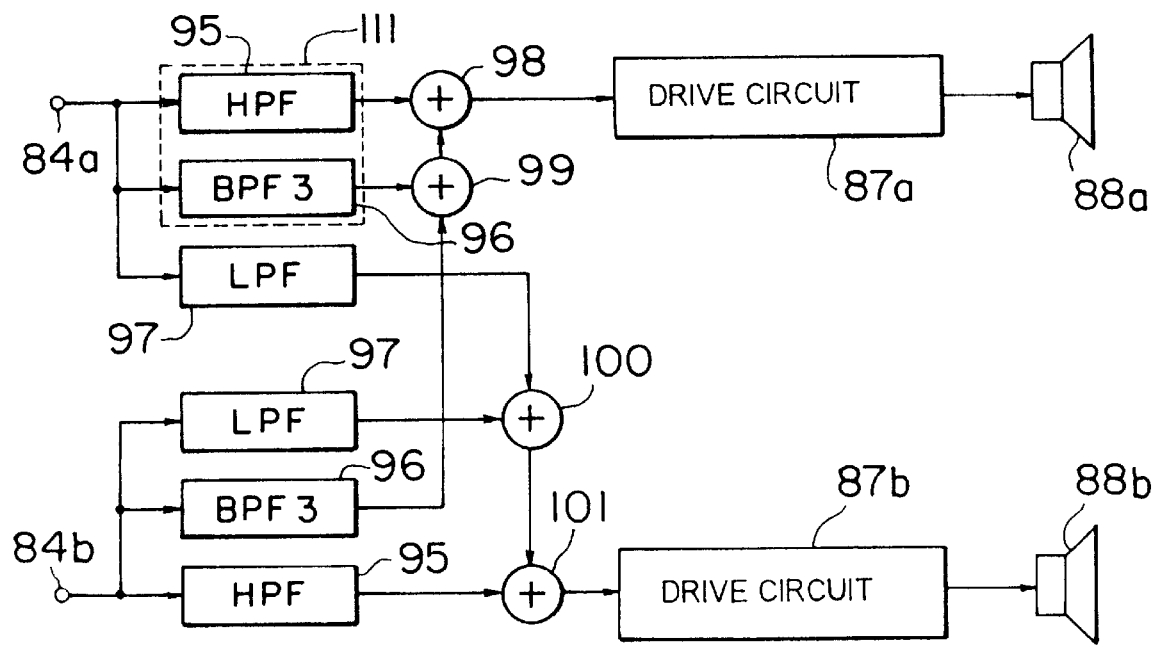
FIG. 46 is a diagram which illustrates a structure of still another embodiment of a drive circuit for the sound reproducing system of the rear projection type image display apparatus according to the present invention.
Figure 47:
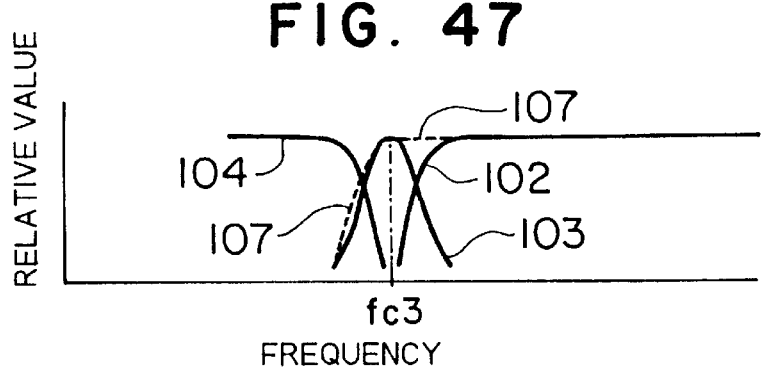
FIG. 47 is a characteristic graph showing frequency characteristics of the filters shown in FIG. 46.
Figure 48:
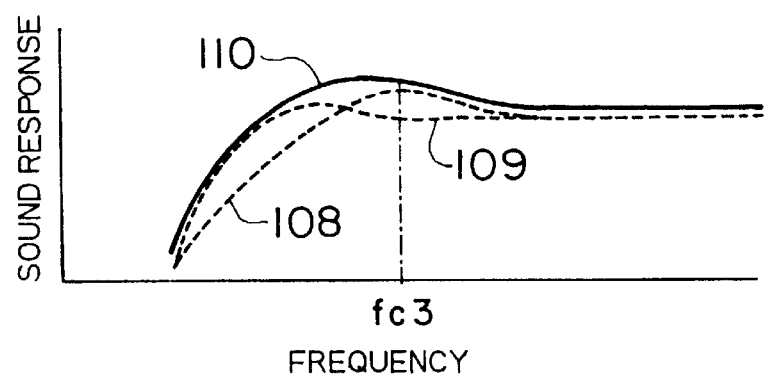
FIG. 48 is a characteristic graph showing the operation of the sound reproducing system shown in FIG. 46.

Another embodiment for improving the accoustic power frequency response, which deteriorates when the capacity of one of the loud speaker chambers is reduced, by means of an electric circuit is shown in FIG. 46. A structure of the embodiment shown in FIG. 46 comprises audio signal input terminals 84a and 84b, high pass filters (HPFs) 95, band pass filters (BPFs) 96, low pass filters (LPFs) 97, adder circuits 98, 99, 100, 101, output or drive circuits 87a and 87b, and speaker units 88a and 88b. This embodiment enables bass range to be widened more efficiently than the embodiment shown in FIG. 43. Parts having the same reference numerals as those of the embodiment shown in FIG. 43 represent the same parts. In this embodiment, the external terminal 84a (84b) is a left (right) audio input terminal, while the speaker unit 88a (88b) is a left (right) sound reproducing system. Referring to FIGS. 47 and 48, the operation of the circuit will now be described. FIG. 47 is a graph showing the relative response of each of the filters 95, 96 and 97. FIG. 48 is a graph showing the acoustic field response reproduced by the speaker units. The sound power frequency responses of the high pass filter 95 band pass filter 96 and low pass filter 97 are indicated respectively by responses 102, 103 and 104. Assuming that the center frequency of the response 103 is fc3, responses 104 and 102 are set to be frequency-dependent responses substantially symmetrical about fc3. The operation for each frequency range of the audio signal will now be described. Initially, audio signals are supplied through the input terminals 84a and 84b. The medium and high frequency components of the supplied audio signal respectively are allowed to pass through the high pass filter 95, adder circuits 98 and 101 and the drive circuits 87a and 87b, and then applied to the speaker units 88a and 88b. Bass range components near the medium tone are selected by the band pass filter 96 and right and left signals are added by the adder circuits 98 and 99. The result of the addition is supplied to the drive circuit 87a. The right and left signals of the bass range component selected by the low pass filter 97 are added by the adder circuits 101 and 100. The result of the addition is supplied to the drive circuit 87b. That is, as shown in FIG. 48 which illustrates the sound power frequency response, the sound power response reproduced by the speaker unit 88a becomes the response 108, while the sound power response reproduced by the speaker unit 88b become the response 109. Since no component that mutually interfere with each other is contained in the bass range signals reproduced by the speaker units 88a and 88b, a synthesized total response 110 can be obtained, which is the result of the addition of the responses 108 and 109 to each other. Since this embodiment employs the means different from the foregoing improvement of the sound reproducing system, the means according to this embodiment may be used in combination with the foregoing improvement of the sound reproducing system. When, for example, frequencies fc3, fp4 and fp7 are set to be closer to one another to combine this embodiment with the embodiment of FIG. 37 or 39, the bass range can be emphasized more efficiently. Thus, an advantage can be obtained in that the load of the drive circuit (heat, dynamic range or the like) and that of the power supply circuit (electric power loss or the like) can be reduced.

A circuit block indicated by a dashed-line frame 111 in FIG. 46 is formed by combining the high pass filter and the band pass filter. As an alternative to this, a high pass filter having a response 107 shown in FIG. 47 may be employed to provide the similar operation.

A means will now be described which is capable of solving the problem that the rear projection type image display apparatus 1 of a type having the housing 10 whose height is reduced considerably has the speaker unit for reproducing a frequency range about 1 kHz, the main range of the audible frequency range, at a position excessively close to the floor, which increase in the reflection from the floor to deteriorate clearness of sound.

Figure 49:
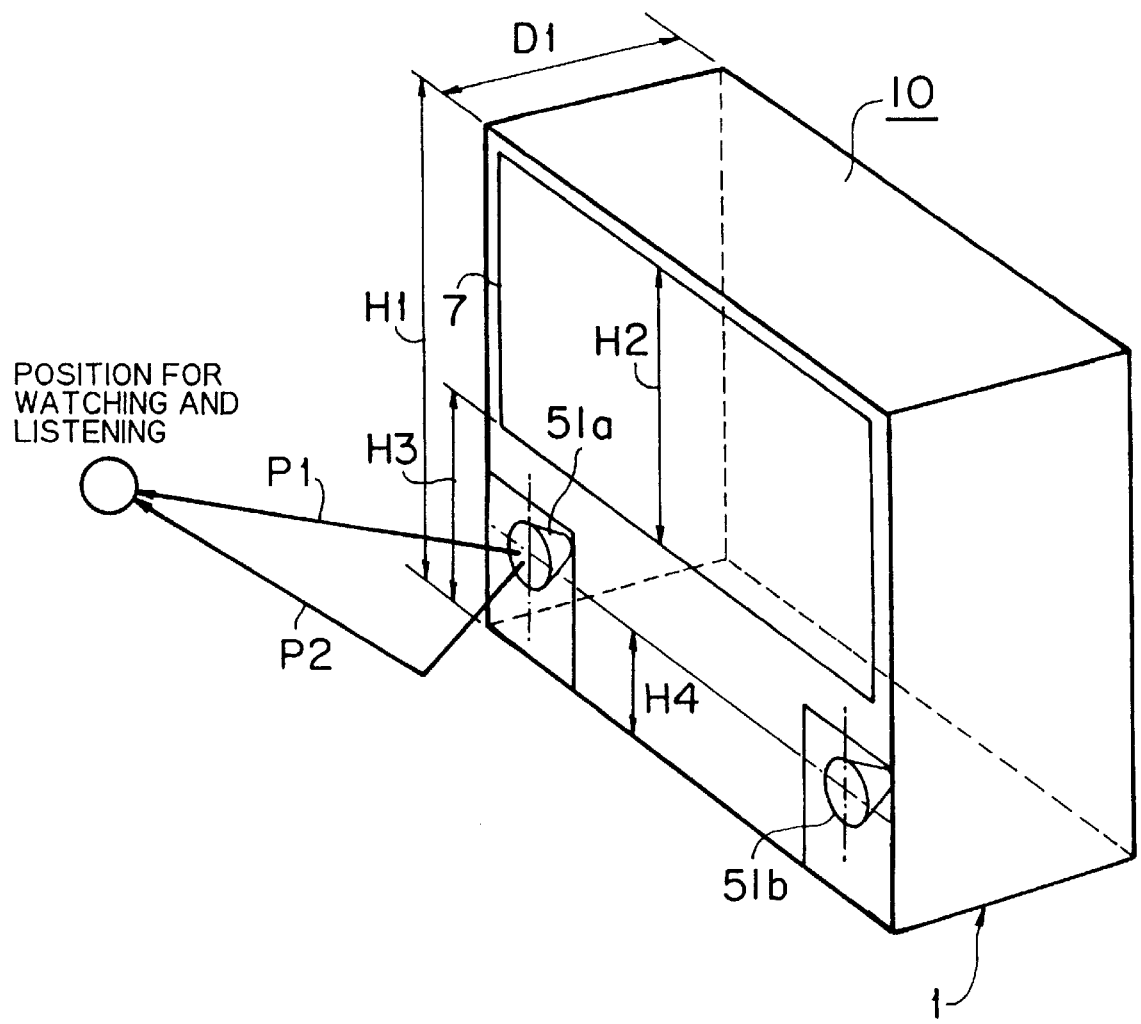
FIG. 49 is a diagrammatic perspective view which illustrates an example of positions, at which loud speakers of the rear projection type image display apparatus according to the present invention are attached.

FIG. 49 is a diagram which illustrates a method or way capable of solving the problem. In FIG. 49, the same parts as those shown in FIG. 33 are given the same reference numerals. A structure of this embodiment comprises the housing 10, the transmission type screen 7 and the speaker units 51a and 51b. Symbols D1, and H1 to H4 represent the lengths, while symbols P1 and P2 represent passages (paths) of sound. A compact rear projection type image display must have the reduced depth D1 and height H1. Since the height H2 of the transmission type screen 7 is constant, the distance H3 from the lower end of the transmission type screen 7 to the floor is shortened. The loud speaker 51a is usually attached at a height about the half of the distance H3 or somewhat lower than the half of the same in view of appearance or design, and stable appearance. As a result, the distance H4 from the center of the loud speaker 51a to the floor is shortened, causing an intensity of the sound passing through the path P2 of the reflection from the floor to increase relative to an intensity of the sound through the path P1, in case where the sound is radiated from the loud speaker 51a. Thus, the clearness of the sound is liable to be deteriorated. This embodiment has a structure that at least relationship H4 >H3/2 is held so that a proportion of the indirect sound component due to the path P2 is decreased in order to improve the clearness of the sound.

Figure 50:
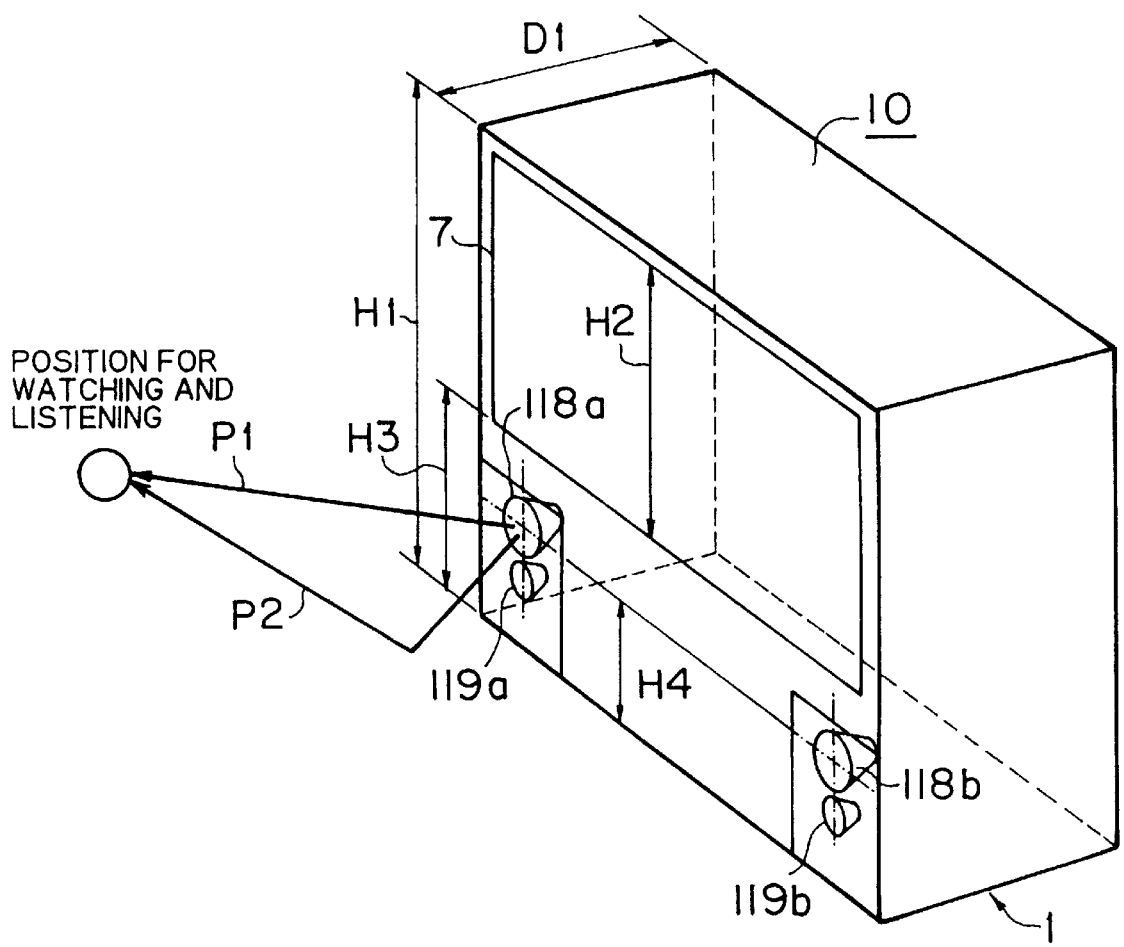
FIG. 50 is a diagrammatic perspective view which illustrates another example of positions, at which loud speakers of the rear projection type image display apparatus according to the present invention are attached.
Figure 51:
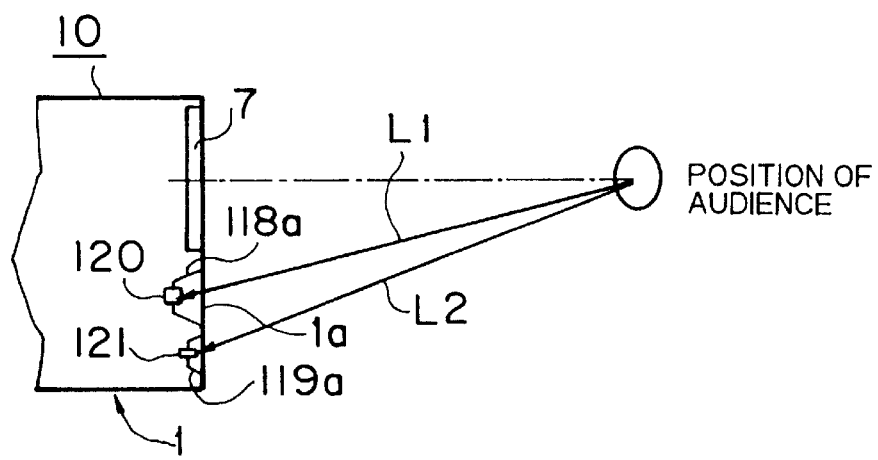
FIG. 51 is a view of explanatory of an effect of the embodiment shown in FIG. 50.

Another embodiment will now be described with reference to FIG. 50. In FIG. 50, the same parts as those shown in FIG. 49 are given the same reference numerals. A structure of this embodiment comprises the housing 10, the transmission type screen 7, and speaker units 118a, 118b, 119a and 119b. A method using a loud speaker (a tweeter) for high tone is employed, to expand a frequency range where an audio signal is reproduced. Reference numerals 119a and 119b represent the tweeters. In general, the design quality and stable appearance requires the loud speaker units (woofers) 118a and 118b having a larger diameter of speaker to be attached at a position lower than the position of the tweeters 119a and 119b. In this embodiment, however, the height H4 of the center of the loud speaker for reproducing medium frequency range of the audio signal is selected to be H4>H3/2. Thus, the woofers 118a and 118b are attached at a level higher than the tweeters 119a and 119b. As a result, a proportion of indirect sound components due to the path P2 can be reduced and, thus, the clearness of the sound can be improved. Although the tweeters 119a and 119b are caused to approach the floor, the influence of reflection from the floor on the reproduced sound is not so significant because the wavelengths of sound from the tweeters are much shorter. Then, an advantage obtainable from the structure that the tweeters 119a and 119b are attached at the level lower than the woofers 118a and 118b will now be described further with reference to FIG. 51. In general, it is required for an audience or viewer to have a watching pose that the center portion the transmission type screen 7 is lower than the eyes of the audience, so that he or she is not exhausted when he or she watches the transmission type screen 7. Then, a distance L1 from the woofer 118a to the eyes of the audience and a distance L2 from the tweeter 119a to the audience, which must be strictly determined, will now be compared. The woofer 118a and the tweeter 119a generate the sound wave substantially at positions of voice coils 120 and 121. In comparison between the loud speakers per se with each other, i.e. horizontally, the voice coil 120 is positioned more remote from the audience than the voice coil 121, in other words, the voice coil 121 is (horizontally) nearer to a front surface 1a of the rear projection type image display 1 than the voice coil 120. Therefore, disposition of the woofer 118a at an upper position relative to the tweeter 119a causes the distance L1 and the distance L2 to be substantially the same. As a result, difference in the times required for the sound waves respectively radiated by the woofer 118a and the tweeter 119a to reach the audience is eliminated, thus enabling an advantage to be obtained in that the time alignment can be corrected.

The effect of the correction of the time alignment is to smooth the sound connection in the vicinity of the crossover frequency between the tweeter 119a and the woofer 118a. In addition to the reduction of the reflection of the sound wave from the woofer 118a, this correction enables to reproduce clearer sound.

Figure 52:
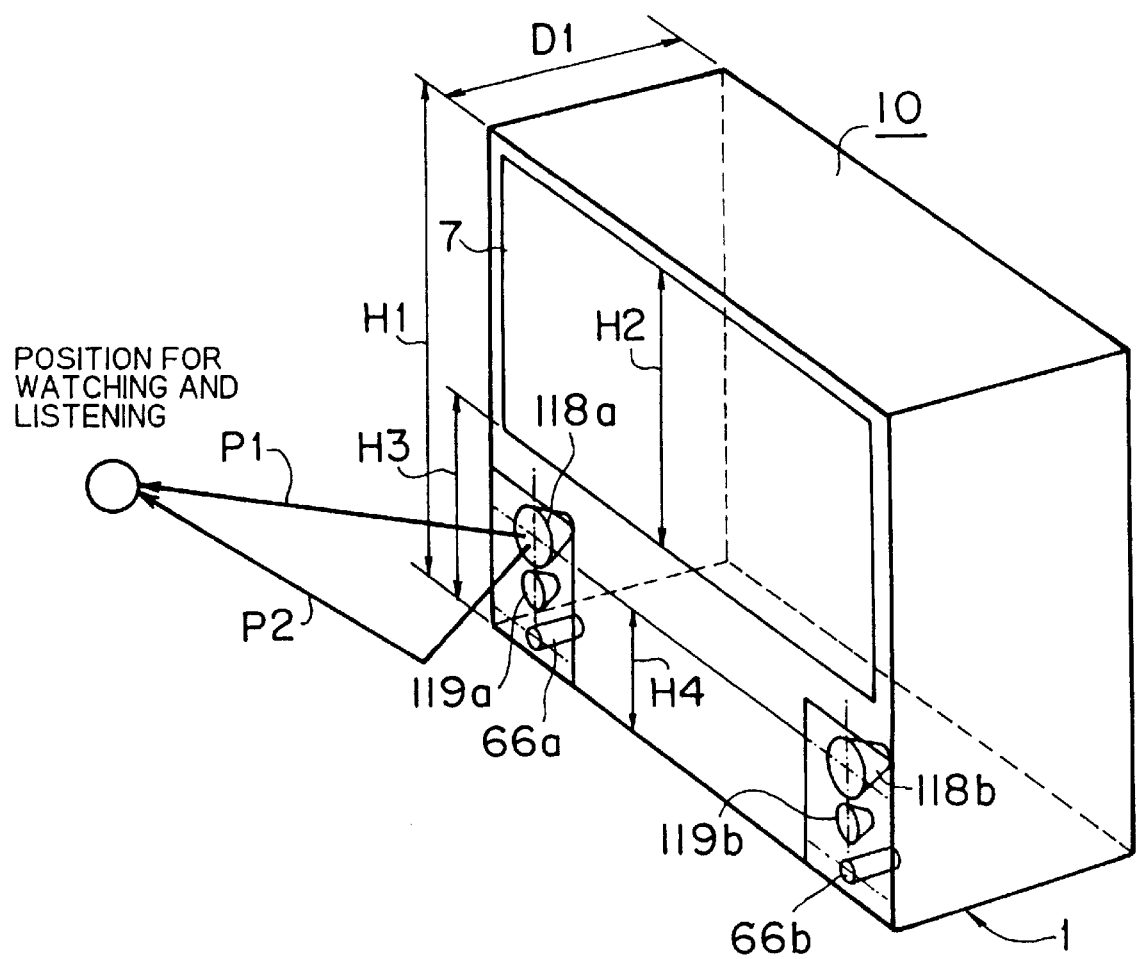
FIG. 52 is a diagrammatic perspective view which illustrates still another example of positions, at which loud speakers of the rear projection type image display apparatus according to the present invention are attached.

FIG. 52 shows still another embodiment of the present invention. In FIG. 52, the same parts as those shown in FIGS. 37 and 50 are given the same reference numerals. A structure of this embodiment comprises the housing 10, the transmission type screen 7, the woofers 118a and 118b, the tweeters 119a and 119b and port tubes 66a and 66b. The difference from the embodiment shown in FIG. 50 is that the port tubes 66a and 66b for bass-reflex characteristics are added. The woofers 118a and 118b are attached near the lower portion of the transmission type screen 7, the tweeters 119a and 119b are disposed below the woofers 118a and 118b, and the port tubes 66a and 66b for the bass-reflex are disposed below the tweeters 119a and 119b. As a result, bass range components radiated through the bass-reflex port tubes can have high sound power due to the influence of the reflection from the floor. Thus, the efficiency of the bass reflex characteristics can be improved.

Thus, an acoustic signal reproducing system can be realized, which is capable of obtaining satisfactory sound power even if a loud speaker chamber having a sufficiently large size cannot be provided because of the compact housing.

Figure 54:
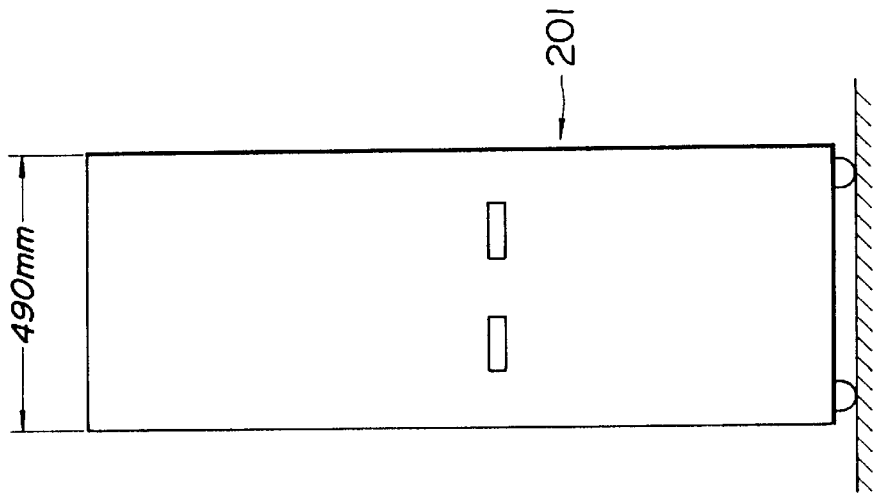
FIG. 54 is a side view which schematically illustrates the shape of the display apparatus shown in FIG. 53.
Figure 53:
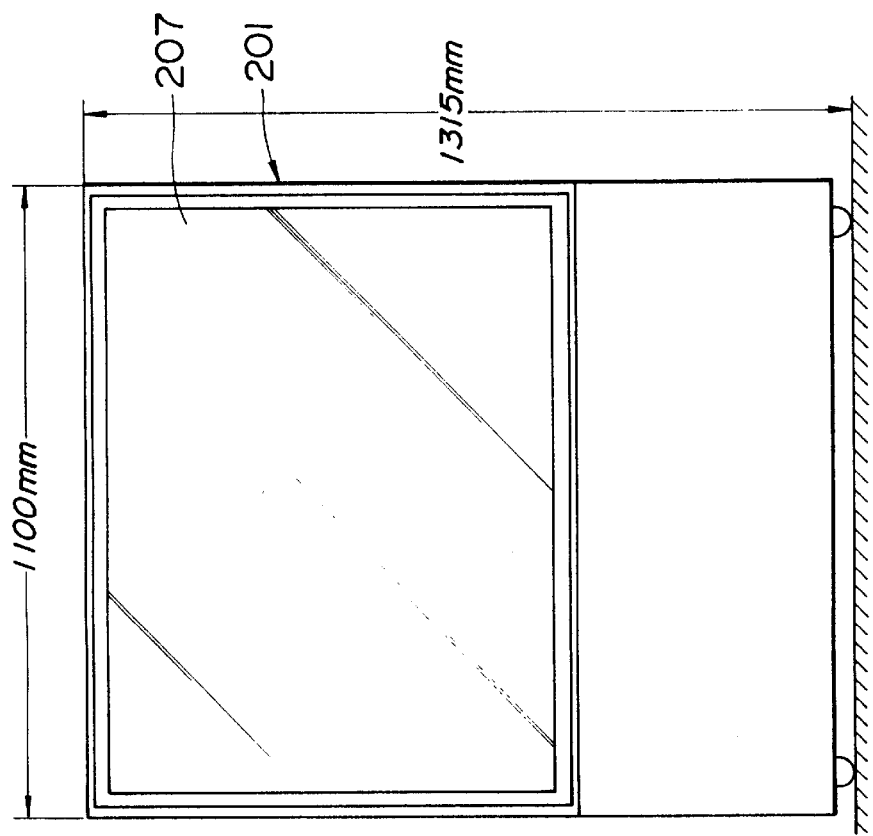
FIG. 53 is a front view which schematically illustrates a shape of the rear projection type image display apparatus according to still another embodiment of the present invention.
Figure 57:
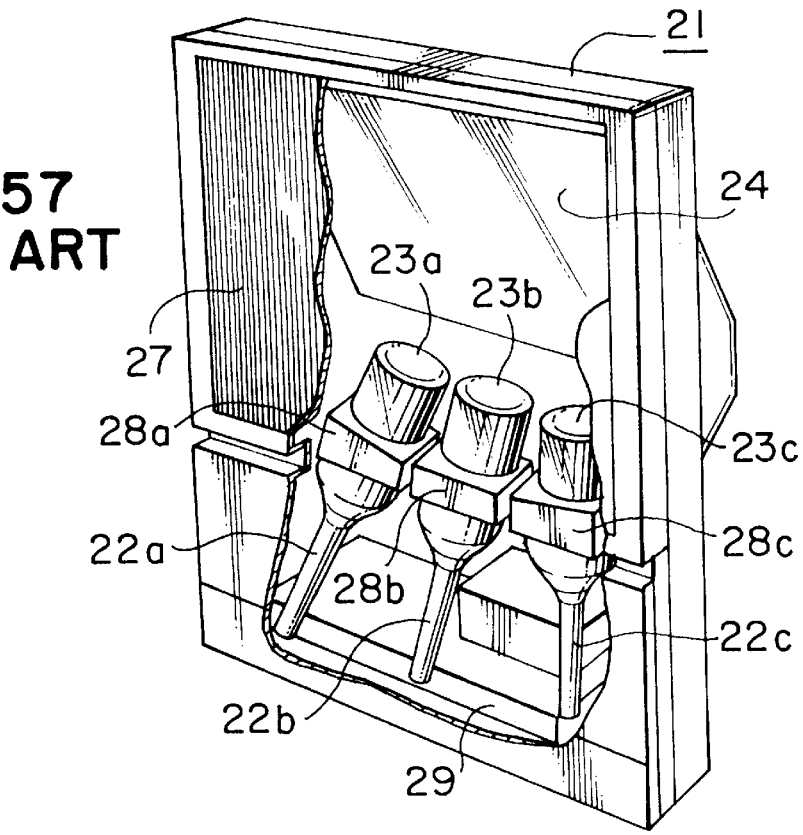
FIG. 57 is a partially broken perspective view which illustrates an example of a conventional rear projection type image display apparatus.
Figure 58:
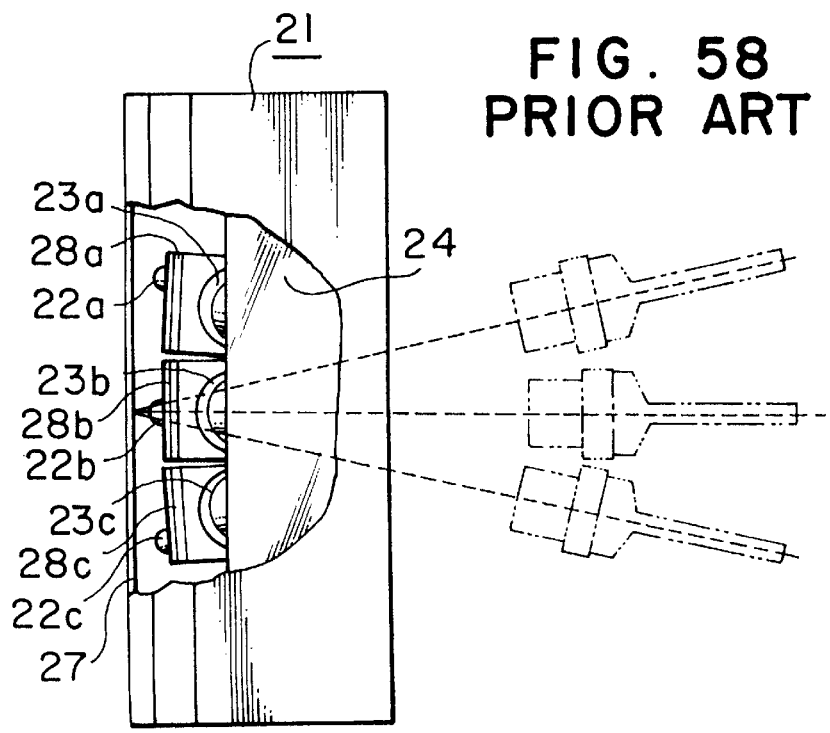
FIG. 58 is a partially broken top plan view which illustrates the display apparatus shown in FIG. 57.
Figure 59:
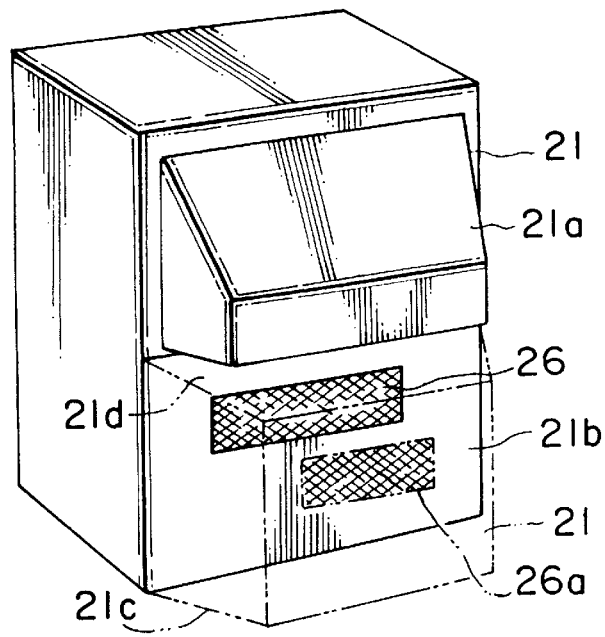
FIG. 59 is a perspective view which illustrates the display apparatus shown in FIG. 57 when viewed from a rear position.

Then, of a rear projection type image display apparatus having a screen size of 40 inches or larger according to an embodiment of the present invention will now be described with reference to FIGS. 53 and 54. Referring to FIGS. 53 and 54, reference numeral 201 represents a rear projection type image display apparatus and 207 represents a transmission type screen for forming a screen of the rear projection type image display apparatus 201.

In this embodiment, the size of the transmission type screen 207 is 50 inches and its aspect ratio is 4:3. The rear projection type image display apparatus 201 has a width of 1,100 mm, a height of 1,315 mm and a depth of 490 mm (FIG. 54). Although it is preferable that the width of the rear projection type image display apparatus 201 is minimized to be installed satisfactorily, the width is determined in accordance with the screen size. As for the height, since rear projection type image displays of a screen size of 40 inches or larger has a very large size of screen, the screen height data shown in FIG. 1 cannot be used. If the screen height is forcibly lowered, the lower end of the screen is lowered excessively for an audience to satisfactorily watch the screen in a case of large screen. Therefore, the height of the rear projection type image display apparatus having a screen size of 40 inches or larger is usually determined to keep balance with the screen. In order to install the rear projection type image display apparatus as desired, it is preferable to minimize the depth. The present invention enables the depth to be 1 cm or lower per inch of the screen. An example of a rear projection type image display apparatus 201 having the screen size of 50 inches shown in FIGS. 53 and 54 will now be described further.

FIG. 55 is a side sectional view which schematically illustrates relationship of the positions of parts relating to the optical system in the rear projection type image display apparatus 201 shown in FIG. 53. In FIG. 55, the same reference numerals as those shown in FIG. 53 represent the same parts. The following parts are not illustrated in FIG. 53: the projection type cathode-ray tube 2; the projection lens 3; the coupler 8 for coupling the projection type CRT (cathode-ray tube) 2 with the projection lens 3; the circuit board 16 for the projection type CRT 2 to supply electric power and signals for displaying an image on the projection type CRT 2; casters 217; a base board 218 constituting a housing 210; a net 219 attached to the base board 218; and a reflecting mirror 204.

As described above, the reference raster size of the projection type cathode-ray tube 2 with respect to green light is 5 inches. A distance from a front end of the projection lens 3 to the transmission type screen 207 through the reflecting mirror 204, that is, a so-called projection distance W3+W4 is 776 mm. The diagonal length of the screen on the transmission type screen 207 is 50 inches. Therefore, the image magnification (ratio) by the projection lens 3 is 10. In FIG. 55, an angle δ between an axis of the projection type cathode-ray tube 2 and the vertical direction is 20 degrees. As a result of the arrangement as described above, the depth of the rear projection type image display apparatus 201 can be made to be 490 mm as shown in FIG. 54, that is, 1 cm or shorter per inch can be realized. Although the structure in a case where the aspect ratio of the screen is 4:3 has been described, the depth can be reduced also in the case where the aspect ratio of the screen is 16:9.

The rear projection type image display having the screen size of 40 inches or larger sometimes further comprises a center loud speaker at the central portion of the lower portion of the housing 210. An object of having the center loud speaker is to serve as a super woofer capable of producing very low frequency range of sound or to enable the 3-1 type stereo sound method optimum for the Hivision system to be realized in the case of the rear projection type image display comprising a screen having the aspect ratio of 16:9. In this case, use of the super woofer for reproducing very low frequency range of sound requires a large capacity loud speaker chamber, thus causing the rear projection type image display apparatus to have an excessive depth to correspond to the size of the loud speaker chamber. In a case where the 3-1 type center speaker is disposed in a relatively wide space adjacent to a neck portion (a portion N shown in FIG. 55) of the projection type cathode-ray tube 2, a magnet of the loud speaker adversely affects the deflecting yoke of the projection type cathode-ray tube 2 or the like. Therefore, the center loud speaker must be disposed in a more upward and narrow portion, i.e. a portion P shown in FIG. 55, in order to avoid the adverse effect on the deflection yoke or the like. Therefore, the depth of the rear projection type image display apparatus is undesirably increased to have the loud speaker also in the this case.

FIG. 56 is a sectional view which schematically illustrates positions of parts relating to the optical system in the rear projection type image display apparatus 201 according to an embodiment of the present invention when viewed from a side position. In FIG. 56, the same parts as those shown in FIG. 55 are given the same reference numerals. In the structure shown in FIG. 56, the center loud speaker 220 and a loud speaker chamber 230 for the center loud speaker 220 are allowed to be disposed by selecting an angle ε between an axis of the projection type cathode-ray tube 2 and the vertical direction to be 10 degrees. As a result, increase in the depth of the housing 210 by only 90 mm enables the loud speaker chamber 230 of a depth of 180 mm for the center loud speaker to be successfully disposed. The embodiment shown in FIG. 56 requires the large-capacity loud speaker chamber 230 in order to reproduce a sound in the very low frequency range. In a case where a 3-1 system center loud speaker is installed, the depth of the loud speaker chamber can be reduced further. Therefore, the depth of the housing 210 can be further reduced.

As described above, the embodiments of the present invention provide the rear projection type image display apparatus capable of overcoming the foregoing problems, requiring only a small space for installation, enabling the rear the display apparatus to be installed with the rear surface thereof along the wall without a gap therefrom, enabling the overall body of the display apparatus to be received deep into a corner of a room if necessary, and having a trim rear surface of the display apparatus thus realizing excellent appearance and enabling cleaning to be performed easily.

That is, most of the embodiment of the present invention have a structure that the diagonal length of the transmission type screen is 33 to 40 inches; and the projection distance of the projection type image display device is 640 mm or shorter.

In a case where the screen size exceeds 40 inches, the projection distance is 16 mm or shorter per inch of the screen size.

Furthermore, the cover for covering the rear surface of the housing of the apparatus is formed into the integral body such that the upper portion and the lower portion are integrated; the back cover are made integral with the side covers or the side and top cover. Furthermore, the back cover has the shape, the width of which is reduced rearwards.

In addition, the convection air outlet in the rear surface of the housing of the display apparatus for radiating heat is positioned more inwards (forward) than the deepest or rear-most position of the housing.

As a result of the foregoing structure, the space required to install the rear projection type image display apparatus can be reduced. If the display apparatus is installed in parallel to the wall, the apparatus can be installed with the rear surface thereof along the wall without any gap. In a case where the display apparatus is installed at the corner of a room, the overall apparatus body can be received deep into the corner. Since the display apparatus has a trim rear surface, an excellent appearance can be realized and cleaning of the display apparatus can be performed easily.

As described above, the embodiments of the present invention has the structure that the projection distance of the projection lens of the rear projection type image display apparatus is significantly shortened; and the parts relating to the optical system and those relating to the electric system are disposed densely, so that the display apparatus can be thinned and made compact. Therefore, the space required to install the apparatus can be reduced. In a case where the apparatus is installed along the wall, the apparatus can be installed with the rear surface thereof along the wall without any gap. If the apparatus is installed at the corner, the overall apparatus body can be received deep into the corner because the width of the rear portion of the housing is reduced rearwardly at any vertical position thereof. Since the back cover is formed into the integral body integral with the side surfaces or the side and top surfaces, the rear surface of the display apparatus has a trim shape, an excellent appearance can be realized and cleaning of the display apparatus can be performed easily.

What is claimed is:

1. A rear projection type image display apparatus, comprising:
   a housing including a convection air inlet and a convection air outlet;
   a projection type image display device having a plurality of image generation sources, a transmission type screen, a plurality of projection lenses, corresponding to the respective image generation sources, for projecting images displayed by the plurality of image generation sources on said transmission type screen, and a reflecting mirror for reflecting light projected by said projection lenses at intermediate positions, heat generated by the projection type image display device being discharged by a natural air convection whereby air enters the housing through the convection air inlet, passes the projection type image display device and exits the housing through the convection air outlet; and
   an electric circuit for displaying the image on said image generation sources, said projection type image display device and said electric circuit being accommodated in a same compartment of the housing at predetermined positions while being secured at the predetermined positions, said electric circuit including at least one electric circuit board,
   wherein a largest electric circuit board among the at least one electric circuit board constituting said electric circuit is disposed on a bottom surface in said housing and heat generated mainly by said largest electric circuit board is discharged from said largest electric circuit board to an outside of said housing by an air duct; and
   wherein at least one electric fan is positioned within the housing adjacent to an outlet of the air duct and remotely from the largest sized circuit board, the fan creating a forced air convection for discharging the heat generated mainly by the largest electric circuit board, the forced air convection and the natural air convection not interfering with one another.

2. A rear projection type image display apparatus according to claim 1, wherein:
   the air duct outlet communicates with the convection air outlet; and
   one or more parts of said electric circuit that generate large heat are concentrated near an inlet of said air duct.

3. A rear projection type image display apparatus according to claim 1, wherein:
   the air duct outlet communicates with the convection air outlet; and
   said air duct accommodates therein a power supply part for said rear projection type image display apparatus.

4. A rear projection type image display apparatus according to claim 1, wherein:
   the air duct outlet communicates with the convection air outlet; and
   one or more surfaces constituting a side wall of said air duct are formed by a portion of said electric circuit board.

5. A rear projection type image display apparatus according to claim 1, wherein:
   the air duct outlet is separated from the convection air outlet; and
   the air duct outlet is formed in at least one of a rear surface of said housing, a side surface of said housing and an edge between said rear surface and said side surface of said housing.

6. A rear projection type image display apparatus according to claim 1, wherein:
   the air duct outlet is separated from the convection air outlet; and
   the convection air outlet is formed in a rear surface of said housing, and at least a portion of said rear surface having said convection air outlet is depressed toward said transmission type screen from an outermost portion of said housing when viewed from a side position of the apparatus.

7. A rear projection type image display apparatus according to claim 6, wherein at least one of two side surfaces of said housing has therein said air duct outlet.

8. A rear projection type image display apparatus according to claim 6, wherein a member having a height higher than the air duct outlet and the convection air outlet separates the two outlets.

9. A rear projection type image display apparatus, comprising:
   a housing including a convection air inlet and a convection air outlet;
   a projection type image display device having a plurality of image generation sources, a transmission type screen, a plurality of projection lenses, corresponding to the respective image generation sources, for projecting images displayed by the plurality of image generation sources on said transmission type screen, and a reflecting mirror for reflecting light projected by said projection lenses at intermediate positions, heat generated by the projection type image display device being discharged by a natural convection air flow entering the housing through the convection air inlet, passing the projection type image display device and exiting the housing through the convection air outlet; and
   an electric circuit for displaying the image on said image generation sources, said projection type image display device and said electric circuit being accommodated in a same compartment of the housing at predetermined positions while being secured at the predetermined positions,
   wherein a width of a rear portion of said housing is reduced rearwards in such a manner that a sectional shape thereof taken along a horizontal surface including a lower end of said reflecting mirror is substantially the same as a sectional shape thereof taken along a horizontal surface including a base board constituting a lower portion of said housing, the width of a rear portion of said housing being narrower than a width of a front portion of said housing whereby the housing has a substantially trapezoidal shape;

wherein at least one electric fan is positioned within the housing adjacent to an outlet of an air duct communicating with an outside of the housing, the fan creating a forced air convection for discharging heat generated by the electric circuit; and wherein the natural air flow through the convection air outlet located in a side surface of said housing is not blocked when the portion of the housing having the wider width abuts an object and is not decreased by the forced air convection through the air duct outlet.

10. A rear projection type image display apparatus according to claim 1, wherein:

the air duct outlet communicates with the convection air outlet; and a depth of the display apparatus is not greater than 400 mm.

11. A rear projection type image display apparatus according to claim 9, wherein:

the air duct outlet communicates with the convection air outlet;

the electric circuit includes a largest sized circuit board; and the at least one electric fan is positioned at a remote location from the largest sized circuit board.

12. A rear projection type image display apparatus according to claim 9, wherein:

the air duct outlet is separated from the convection air outlet; and the convection air outlet is located in a rear portion of the housing.

13. A rear projection type image display apparatus according to claim 9, wherein:

the air duct outlet communicates with the convection air outlet; and a depth of the display apparatus is not greater than 400 mm.

* * * * *